US011901667B2

(12) United States Patent
Morris et al.

(10) Patent No.: US 11,901,667 B2
(45) **Date of Patent: *Feb. 13, 2024**

(54) PROTECTIVE COVER DEVICES FOR PROTECTING ELECTRICAL CONNECTORS IN INDUSTRIAL EQUIPMENT

(71) Applicant: Rockwell Automation Technologies, Inc., Mayfield Heights, OH (US)

(72) Inventors: Garron Morris, Whitefish Bay, WI (US); Garrett Wolff, Sussex, WI (US); Craig Devroy, New Berlin, WI (US); James Carter, Wauwatosa, WI (US); Christopher Genthe, West Bend, WI (US); Nicholas De Leo, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,219

(22) Filed: Feb. 13, 2023

(65) Prior Publication Data

US 2023/0198197 A1 Jun. 22, 2023

Related U.S. Application Data

(63) Continuation of application No. 17/020,755, filed on Sep. 14, 2020, now Pat. No. 11,605,917.

(51) Int. Cl.
*H01R 13/533* (2006.01)
*H01R 12/71* (2011.01)
*H01R 13/514* (2006.01)

(52) U.S. Cl.
CPC ......... *H01R 13/533* (2013.01); *H01R 12/716* (2013.01); *H01R 13/514* (2013.01)

(58) Field of Classification Search
CPC .. H01R 12/712; H01R 12/716; H01R 13/514; H01R 13/533

(Continued)

(56) References Cited

U.S. PATENT DOCUMENTS 5,688,133 A 11/1997 Ikesugi et al.
5,810,611 A 9/1998 Compagnon
(Continued)

FOREIGN PATENT DOCUMENTS

EP 2 043 147 A2 4/2009
EP 2 793 316 A1 10/2014
(Continued)

OTHER PUBLICATIONS

Publication titled "101X: Electronics Nanocoating", Hydrophobic Electronics Nanocoating | Drywired 101X, publication date unknown, printed Sep. 15, 2020.

(Continued)

*Primary Examiner* — Khiem M Nguyen
(74) *Attorney, Agent, or Firm* — Lippes Mathias LLP

(57) ABSTRACT

Protective cover devices for associated electrical connectors include a one-piece molded polymeric body including at least one of: (i) at least one stud that is closely slidably received into a corresponding socket of the connector; (ii) a skirt that comprises a recess that receives at least part of the electrical connector therein. The protective cover device is adapted to be engaged with the associated electrical connector to inhibit contact between a surrounding corrosive atmosphere and at least one electrical contact of the associated electrical connector.

13 Claims, 21 Drawing Sheets

(58) Field of Classification Search
USPC .............................................. 439/55, 78, 940
See application file for complete search history.

(56) References Cited

U.S. PATENT DOCUMENTS

| | | | | |
|---|---|---|---|---|
| 6,315,584 | B1 | 11/2001 | Greenside et al. | |
| 6,979,211 | B1 | 12/2005 | Shen | |
| 7,866,990 | B2 | 1/2011 | Liao | |
| 11,605,917 | B2 * | 3/2023 | Morris ................. | H01R 13/443 |
| 2003/0207601 | A1 | 11/2003 | Adachi | |
| 2005/0070129 | A1 | 3/2005 | Zhang et al. | |
| 2007/0249194 | A1 | 10/2007 | Liao | |
| 2015/0077955 | A1 | 3/2015 | Tio | |
| 2020/0203897 | A1 | 6/2020 | Zhong et al. | |
| 2021/0257769 | A1 | 8/2021 | Sakoda | |

FOREIGN PATENT DOCUMENTS

| | | | |
|---|---|---|---|
| EP | 3 422 399 | A1 | 1/2019 |
| EP | 3422399 | A1 | 1/2019 |
| EP | 3 667 717 | A1 | 6/2020 |
| EP | 3667717 | A1 | 6/2020 |
| GB | 2500138 | B | 3/2014 |
| WO | 2016033248 | A1 | 3/2016 |
| WO | WO 2020/004076 | A1 | 1/2020 |

OTHER PUBLICATIONS

Publication titled "*Drywired®, Safety Data Sheet, Drywired® 101X 6 Series*", publication date unknown, printed Sep. 15, 2020.
Publication titled "*101x 6 Series Technical Data Sheet*", drywired.com, publication date unknown, printed Sep. 15, 2020.
Extended European Search Report dated May 13, 2022 for Application No. EP 21 19 4004.4.
Partial European Search Report dated Feb. 4, 2022 for Application No. EP 21 19 400.4.
Extended European Search Report dated Feb. 9, 2022 for Application No. EP 21 19 3567.1.
Anonymous: "What Are Conformal Coatings? Everything you need to know", Nov. 4, 2016 (Nov. 4, 2016), XP093087211, Retrieved from the Internet: URL:https://electrolube.com/knowledge_base/what-are-conformal-coatings/ [retrieved on Sep. 29, 2023], 6 pages.
European Patent Office, "Communication pursuant to Rule 62 EPC, Extended European Search Report", application No. 23185179.1 EPO, dated Oct. 11, 2023 19, 2023, 14 pages.
Examination Report for European (EP) Application No. 21 194 004.4, dated Jul. 24, 2023, (14 pages).

* cited by examiner

PROTECTIVE COVER DEVICES FOR PROTECTING ELECTRICAL CONNECTORS IN INDUSTRIAL EQUIPMENT

CROSS-REFERENCE TO RELATED APPLICATION

This application is a continuation of U.S. Ser. No. 17/020,755 filed Sep. 14, 2020, and the entire disclosure of said application Ser. No. 17/020,755 is hereby expressly incorporated by reference into the present specification.

BACKGROUND INFORMATION

Motor drives and other industrial electrical equipment are often used in environments that have a corrosive atmosphere that can be highly detrimental to the internal electronic components. For example, industrial motor drives are often used in harsh environments where they are exposed to sulfur (e.g. particulate sulfur or gaseous compounds such as hydrogen sulfide gas) or chlorine gases. These compounds and others have been found to cause corrosion of exposed metallic surfaces inside the equipment such as exposed metal contacts of electrical connectors. Such corrosion can cause premature and unexpected failure of the motor drive or other equipment which is highly undesirable event. In some cases, the corrosion leads to broken or open connections that interrupt critical circuits and in other cases the corrosion can lead to the formation of electrically conductive dendrites that can extend between two contacts or between a contact and an adjacent metal surface such that arcing, fire, short circuits, or other failures occur. In other instances, the corrosion can severely damage an exposed, unused electronic contact or connector to the extent that it is no longer functional as required for future use or to the extent that it causes corrosive damage to related or adjacent components. As such, a need has been found for a device and system for protecting unused and exposed electrical connectors and other exposed electrical contacts of PCBAs and other electronic components used in industrial equipment that is exposed to corrosive environments.

BRIEF DESCRIPTION

In accordance with one aspect of the present development, a printed circuit board assembly includes an electrical connector including at least one electrical contact. A protective cover device is engaged with the electrical connector and covers the at least one electrical contact to inhibit contact between a surrounding atmosphere and the at least one electrical contact to protect the electrical contact against corrosion. The protective cover device includes a one-piece molded polymeric body including at least one of: (i) at least one stud that is closely slidably received into a corresponding socket of the connector; (ii) a skirt that includes a recess that receives at least part of the electrical connector therein.

In accordance with another aspect of the present development, a protective cover device for an associated electrical connector includes a one-piece molded polymeric body including at least one of: (i) at least one stud that is closely slidably received into a corresponding socket of the connector; (ii) a skirt that comprises a recess that receives at least part of the electrical connector therein. The protective cover device is adapted to be engaged with the associated electrical connector to inhibit contact between a surrounding corrosive atmosphere and at least one electrical contact of the associated electrical connector.

DETAILED DESCRIPTION

FIG. 1 (including FIGS. 1A, 1B, 1C, 1D, 1E) illustrates a protective cover device formed in accordance with a first embodiment of the present development and a printed circuit board assembly including same operatively connected thereto. More particularly, FIG. 1A partially illustrates a printed circuit board assembly (PCBA) P comprising a circuit board B and plurality of electronic components E operatively connected thereto. The plurality of electronic components E include one or more electronic connectors C1 of a first type that are operable connected to the printed circuit board assembly P. In the illustrated example, the connectors C1 are cable-to-board PCI express (PCIE) connectors. The electronic connectors C1 (shown separately in FIG. 1B) each comprise a plurality of metallic electrical contacts C1X for mating with corresponding metallic electrical contacts of an associated mating connector that mates with the connector C1 such as a plug, socket, printed circuit board, or any other associated mating device. Each contact C1X is connected to or otherwise includes a metallic pin C1P that is mechanically and electrically secured to the circuit board B for transmission of electrical power and/or electronic data signals between the printed circuit board assembly P and the contacts C1X.

The connector C1 comprises a one-piece molded polymeric body C1B that contains the contacts C1X. In the illustrated embodiment, the connector body C1B defines one or more slots C1S (two slots C1S of unequal length in the illustrated embodiment) that open through an outer face C1F and in which the electrical contacts C1X are located. The body C1B of the illustrated connector: C1 also includes one or more external lock teeth C1T (each one an external lock tooth C1T) that each comprise a tapered ramp C1R that is connected to and begins adjacent the outer face C1F of the connector C1 and that diverges outwardly away from the outer face as it extends toward the printed circuit board assembly P. The external lock teeth CIT also comprise a transverse lock face C1L that transversely intersects the tapered ramp C1R at a location between the outer face C1F and the printed circuit board assembly P.

Figure 1A:
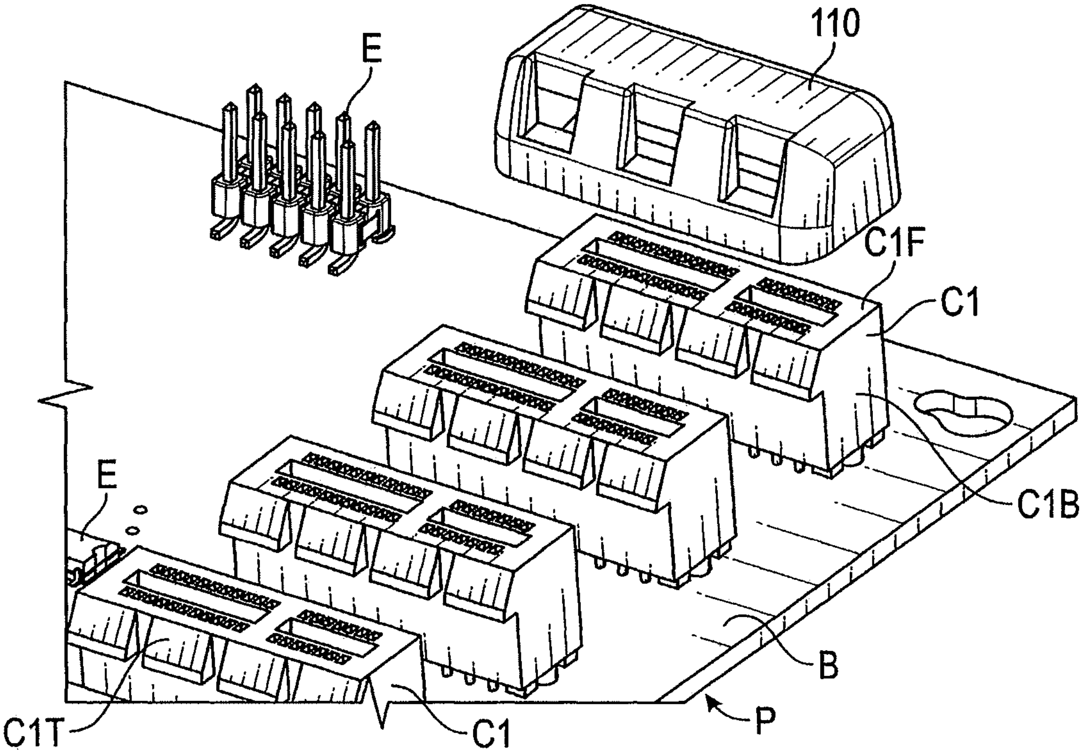
FIG. 1A is an exploded view that illustrates a printed circuit board assembly including a first type of electrical connector and a protective cover device formed in accordance with a first embodiment of the present development.
Figure 1B:
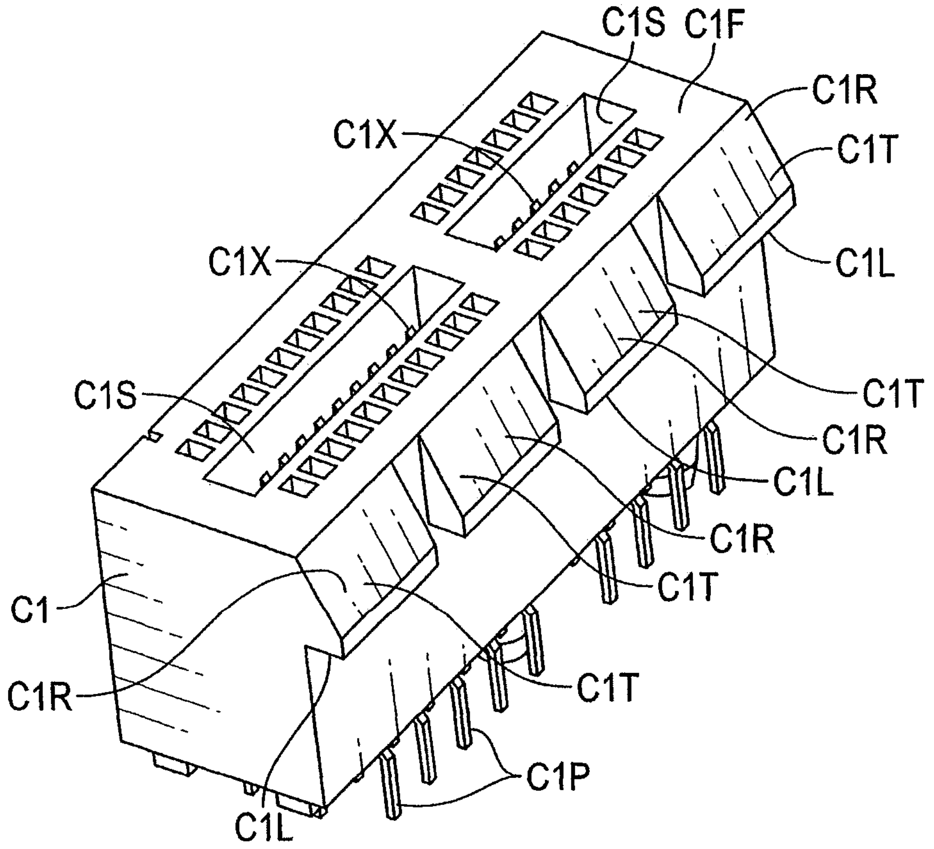
FIG. 1B shows the first type of electrical connector by itself.
Figure 1C:
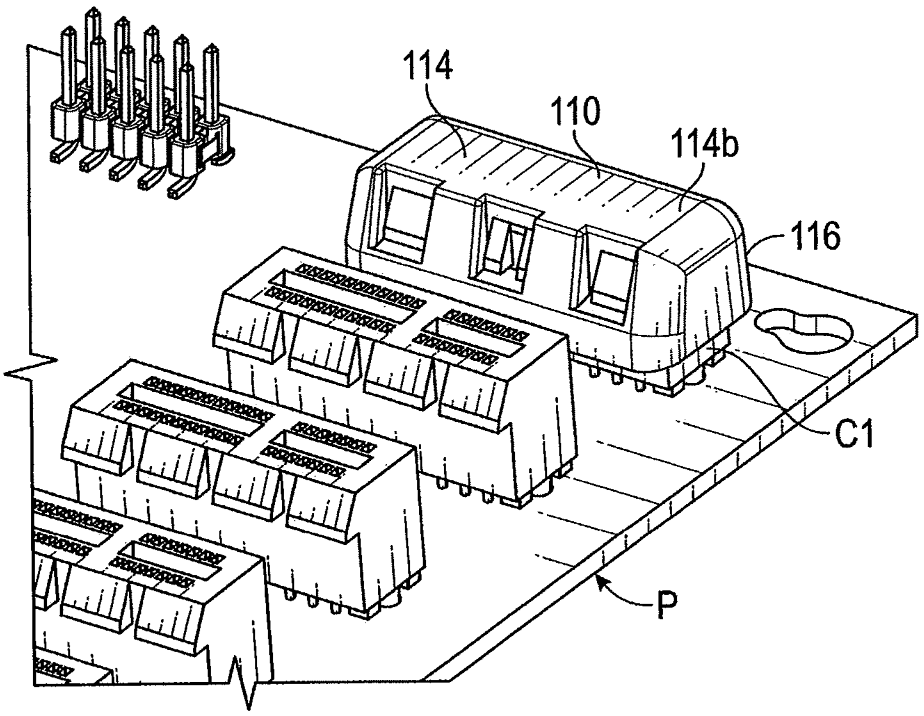
FIG. 1C is similar to FIG. 1A but shows the protective cover device operatively installed on the first type of electrical connector.

In many final operative installations such as fully assembled and operational motor drive or other item of industrial electrical equipment, one or more of the connectors C1 are unused or "open" as shown in FIGS. 1A & 1B, i.e., not mated with an associated mating connector. In such cases, the electrical contacts C1X of such unused connectors C1 are exposed to the atmosphere that is ambient in any location(s) where the motor drive or other item of electrical equipment is transported, stored, and/or operatively installed. The ambient atmosphere can include corrosive gases and particulates that can corrode or otherwise contaminate or foul the electrical contacts C1X. Examples of such contaminants include particulate sulfur, hydrogen sulfide gas, chlorine gas, and/or sulfur particulates and the like. Any corrosion or other contamination or fouling of the electrical contacts C1X is highly undesirable in that it can render the connector C1 inoperable for potential future use as an expansion connector, a maintenance connector, an alternate connector or the like. Furthermore, any corrosion or contamination of the connector contacts C1X can cause short circuits between adjacent contacts C1X and/or pins C1P and can lead to an overall increase of corrosion on the printed circuit board assembly P.

To avoid the above-described degradation of the unused connectors C1, a selectively installable and removable protective cover or cover device 110 is operatively engaged with each unused connector C1 (as shown for one of the connectors C1 in FIG. 1B) and protects the contacts C1X thereof. The cover device 110 can be selectively removed from the connector C1 on which it is operatively installed for normal operative use of the connector C1.

Figure 1D:
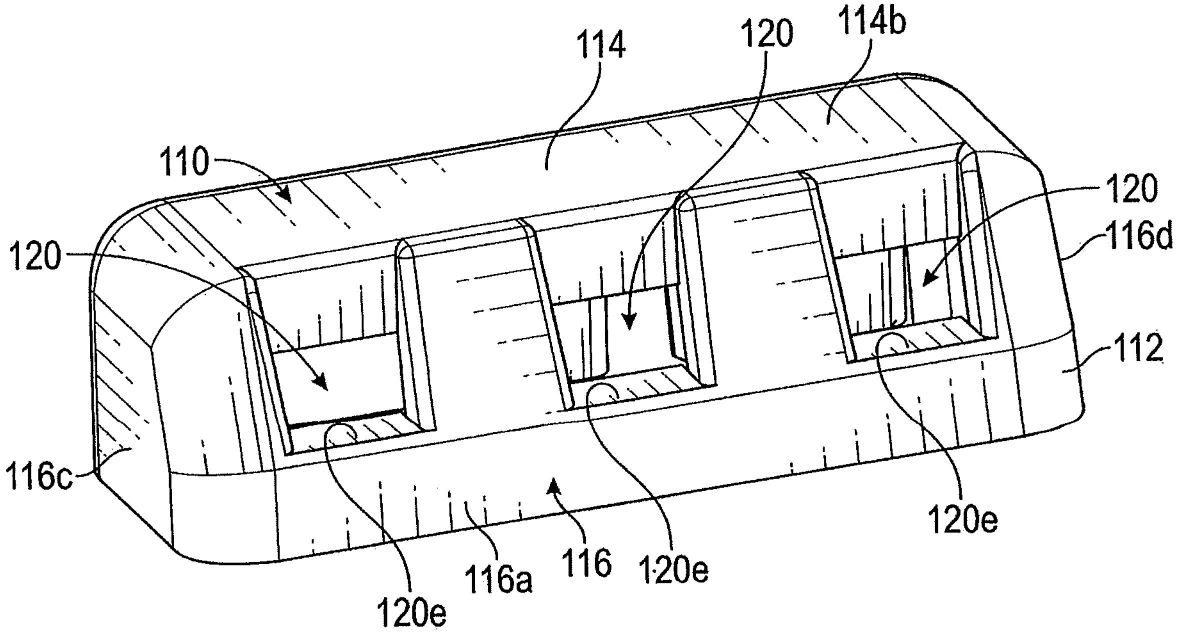
FIGS. 1D & 1E, provide respective top and bottom isometric views of the protective cover device of FIGS. 1A & 1B.
Figure 1E:
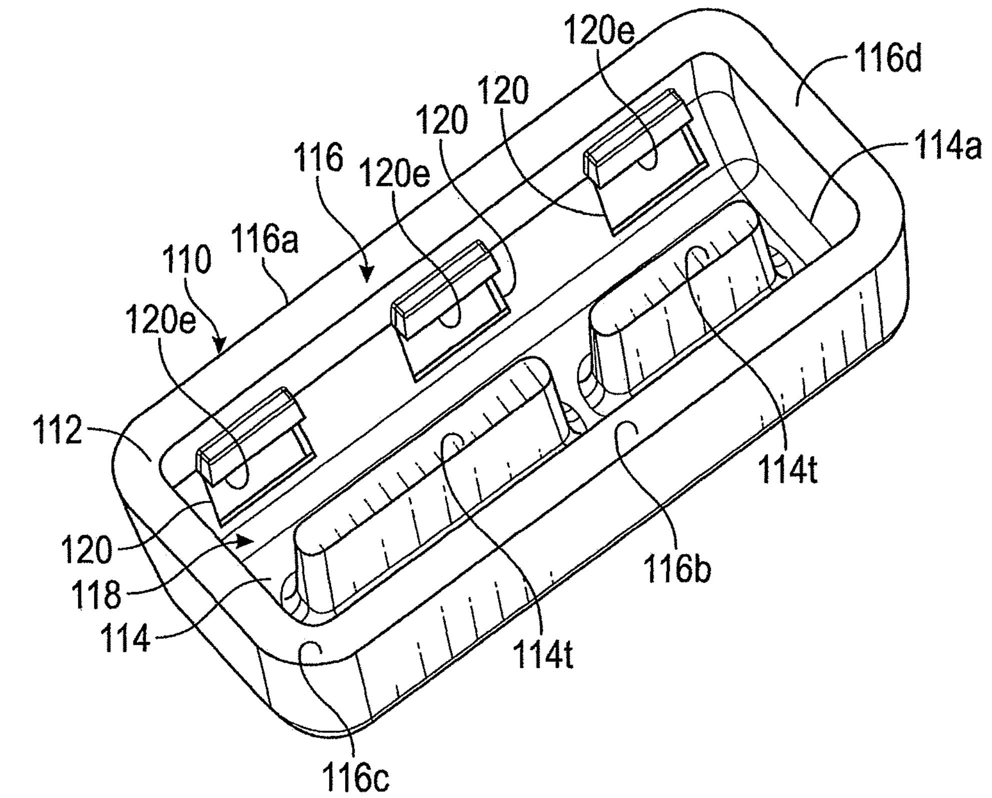

Referring also to FIGS. 1D & 1E which respectively provide top and bottom isometric view of the protective cover device 110 by itself, the protective cover device provided in accordance with a first embodiment of the present development comprises a one-piece molded polymeric body 112 that is adapted to be releasably engaged with the connector body C1B as shown in FIG. 1B. The cover body 112 includes a planar main wall 114 with opposite inner and outer faces 114*a*,114*b*. A peripheral skirt 116 depends from the main wall 114 in a first direction such that an internal recess 118 is defined between the skirt 116 and the inner face 114*a* of the main wall 114. The skirt 116 includes first and second spaced-apart side walls 116*a*,116*b* connected to opposite lateral sides of the main wall 114 and comprises first and second spaced-apart end walls 166*c*,116*d* that extend between and interconnect the first and second side walls 116*a*,116*b* at opposite axial ends of the main wall 114.

When the cover device 110 is operatively installed on a connector C1 (FIG. 1B), the connector body C1B is at least partially received inside the recess 118 of the cover 110 and the main wall 114 covers the contacts C1X and slots C1S to protect same. The cover recess 118 is conformed and dimensioned to correspond with the connector body C1B so as to ensure that the connector body C1B is closely received in the recess 118 with minimal clearance. More particularly, the cover main wall 114 covers the slots C1S in which at least some the contacts C1X are located to inhibit ingress of gaseous, aerosol/vapor, and/or particulate contaminates into the slots C1S where such contaminates can damage the contacts C1X and/or collect in the slot(s) C1S. To further protect the contacts C1X located in the slot(s), the cover device 110 preferably comprises one or more tabs 114*t* that project outwardly from the inner face 114*a* of the main wall into the recess 118 preferably for a distance less than the depth of the recess 118 so that the tabs 114*t* are contained entirely in the recess 118, i.e., the tabs 114*t* do not project axially outward beyond the skirt 116. The number, size, location, and shape of the tab(s) 114*t* correspond respectively to the number, size, location, and shape of the connector slots C1S such that the tab(s) 114*t* are respectively received with minimal surrounding clearance into the connector slots) C1S to fill the slot(s) C1S and thus inhibit entry of contaminates into the slot(s) C1S.

The first side wall 116*a* includes one or more lock tooth retention notches 120 that open through the first side wall 116*a* and that are located and shaped to receive and releasably engage and retain a correspondingly located external lock tooth C1T such that the mutual engagement between an external lock tooth C1T of the connector body C1B and a corresponding lock tooth retention notch 120 of the cover 110 releasably retains the cover 110 in its operative position in covering relation with the connector body C1B. More particularly, the transverse lock face C1L of each lock tooth C1T abuts and is engaged with a corresponding locking edge 120*e* of a respective mating retention notch 120 to capture the cover 110 in its operative position on the connector C1. During installation of the cover 110, the first sidewall 116*a* of the cover 110 engages the connector lock tooth ramp face C1R. and is resiliently deflected outwardly away from the second cover sidewall 116*b* so that that the cover 110 is received over and retained by the lock teeth C1T. The cover 110 can be removed from the connector C1 by pulling the cover 110 outwardly away from the connector 110 in a direction normal to the printed circuit board assembly P so that the sidewall 116*a* is resiliently deflected outwardly relative to the second sidewall 116*b* by the lock teeth C1T so that the tooth retention notches 120 respectively disengage from the lock teeth C1T.

Figure 2A:
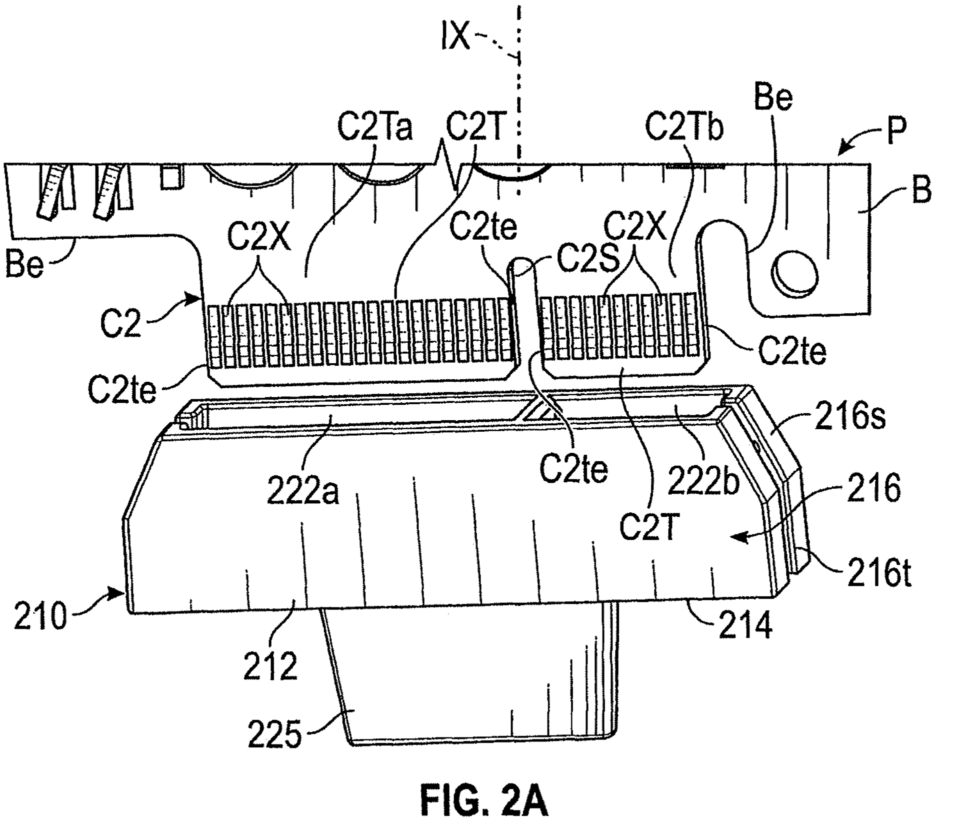
FIG. 2A is an exploded view that illustrates a printed circuit board assembly including a second type of electrical connector and a protective cover device formed in accordance with a second embodiment of the present development.
Figure 2B:
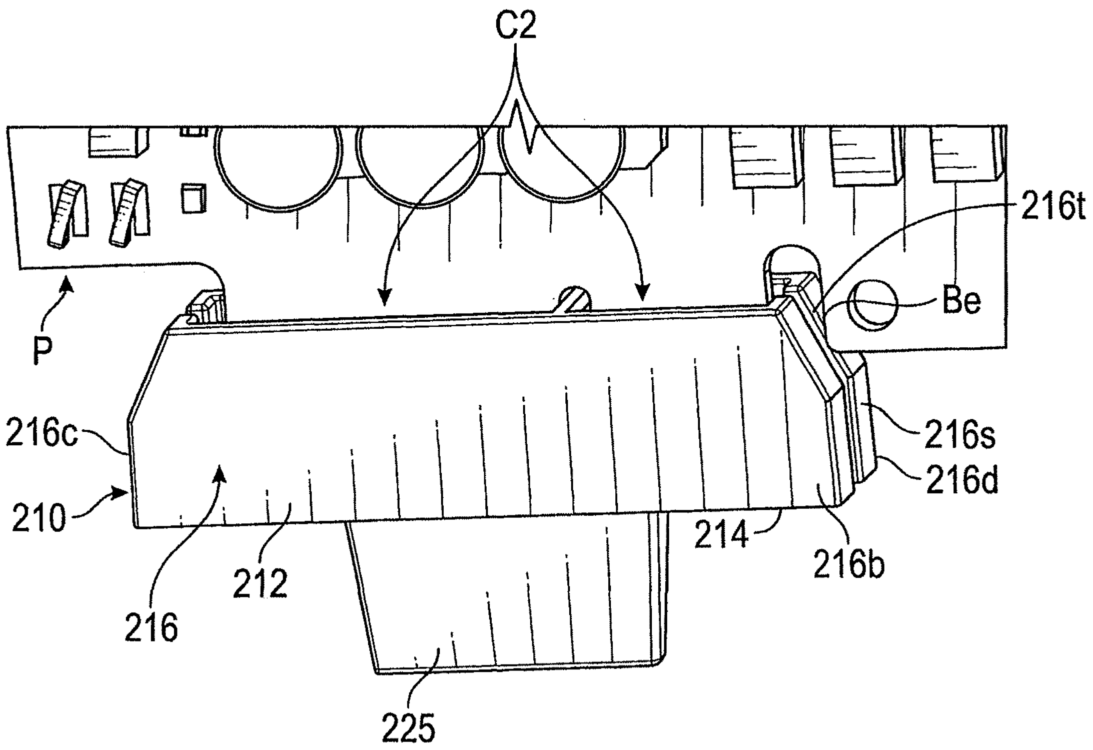
FIG. 2B is similar to FIG. 2A but shows the protective cover device operatively installed on the second type of electrical connector.

As shown in FIGS. 2A & 2B, the printed circuit board assembly P can further comprise one or more open or unused edge connectors C2. A selectively installable and removable protective cover or cover device 210 formed in accordance with a second embodiment of the present development is engaged with each unused or open edge connector C2 (as shown in FIG. 2B) to protect the edge connector C2 from corrosion and other contamination due to environmental contaminants. The cover device 210 can be selectively removed from the edge connector C2 on which it is operatively installed for normal operative use of the edge connector C2.

Each edge connector C2 comprises at least one projecting tab C2T that projects outwardly from a peripheral edge Be of the circuit board B in the plane of the circuit board B thereof. In the illustrated embodiment, the edge connector C2 comprises first and second edge connector tabs C2Ta, C2Tb (generally tabs C2T) separated by an open slot C2S. Each edge connector tab C2Ta,CT2*b* comprises a plurality of metallic electrical contacts C2X that are adapted to contact and mate electrically with respective corresponding metallic electrical contacts of an associated mating slot connector into which the edge connector C2 is adapted to be releasably received by insertion along an insertion axis IX. The first and second edge connector tabs C2Ta,C2Tb each first and second lateral side edges C2*te* that extend parallel to each other and parallel to the insertion axis IX. The first and second edge connector tabs C2Ta,C2Tb each also include a transverse outer edge C2*tf* that extends between and interconnects the first and second lateral side edges C2*te*. The transverse outer edges C2*tf* of the first and second tabs C2Ta,C2Tb are aligned with each other but are unequal length with respect to each other.

To avoid the above-described degradation of the contacts C2X of any unused or "open" edge connectors C2, the cover device 210 is operatively engaged with each unused edge connector C2 as shown in FIG. 2B and protects the contacts C2X thereof from corrosion or contamination. The cover device 210 can be selectively removed from the connector C2 on which it is operatively installed for normal operative use of the connector C2.

Figure 2C:
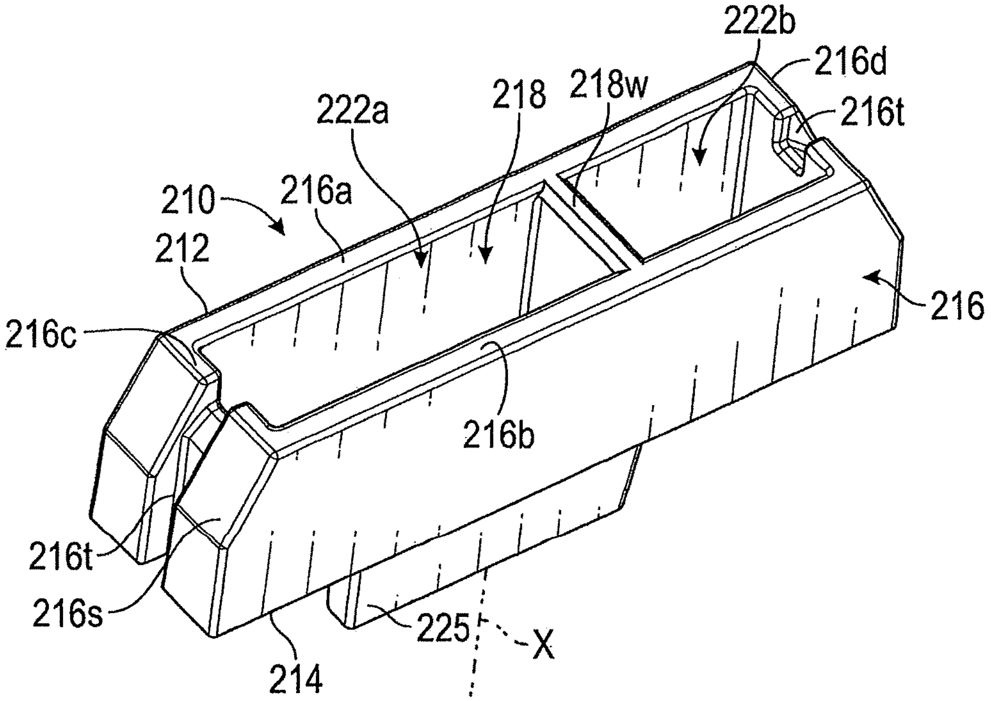
FIG. 2C is an isometric view of the protective cover device of FIGS. 2A & 2B by itself.

The cover device 210 is shown separately in FIG. 2C and comprises a one-piece molded polymeric body 212 that is adapted to be releasably engaged with the edge connector C2 as shown in FIG. 2B. The body 212 includes a main wall 214 and a skirt 216 projecting axially outwardly from the main wall 214 along a longitudinal axis CX of the cover. The skirt 216 is closed at an inner end by the main wall 214 and open at its outer end spaced from the main wall 214. The skirt 216 comprises first and second spaced-apart sidewalk 216*a*,216*b* and comprises first and second spaced-apart end walls 216*c*,216*d* that extend between and interconnect the first and second sidewalls 216*a*,216*b* such that an open recess 218 is defined by the skirt 216 and the main wall 214. A transverse divider wall 218*w* extends between the first and second sidewalk 216*a*,216*b* and divides the recess 218 into first and second open slots or regions 222*a*,222*b* that are conformed and dimensioned to receive the first and second edge connector tabs C2Ta,C2Tb, respectively, with minimal clearance.

When the cover device 210 is operatively mated with the edge connector C2 as shown in FIG. 2B, the transverse divider wall 218*w* is closely received in the edge connector slot C2S and the edge connector tabs C2Ta,C2Tb are respectively closely received in the first and second recess regions 222*a*,222*b* so that the cover device 210 covers and protects the electrical contacts C2X. The recess regions 222*a*,222*b* of the cover 210 extend along the cover longitudinal axis X for a sufficient length so that the electrical contacts C2X of the edge connector C2 are fully received in the recess regions 222*a*,222*b* and are covered and protected by the first and second skirt sidewalls 216*a*,216*b*, The cover device 210 is retained in its operative position by frictional engagement with the edge connector C2 or other part of the circuit board B, such as by frictional engagement between the divider wall 218*w* and the edge connector slots C2S, by frictional engagement between the edge connector tabs C2Ta,C2Tb and the walls 216*a-d* and 218*w* of the skirt 216, and/or by frictional engagement between an outer surface 216*s* of one or both of the skirt end walls 216*c*,216*d* and the circuit board B. The outer surface 216*s* of one or both skirt end walls 216*c*,216*d* can include a slot 216*t* that extends parallel to the cover axis X and that is sized and dimensioned to closely receive and frictionally engage an adjacent edge Be of the circuit board B to further frictionally engage the cover 210 with the circuit board B and to stabilize the cover in its installed operative position as shown in FIG. 2B to prevent inadvertent dislodgement of the cover device 210 from the edge connector C2.

The edge connector cover device 210 preferably includes a grasping appendage or grip such as the illustrated fin or tab 225 that projects outwardly from the main wall 214 in a direction opposite to that of the skirt 216. The tab 225 is adapted for being manually grasped by a user for installation and removal of the cover device 210 relative to the edge connector C2.

Figure 3A:
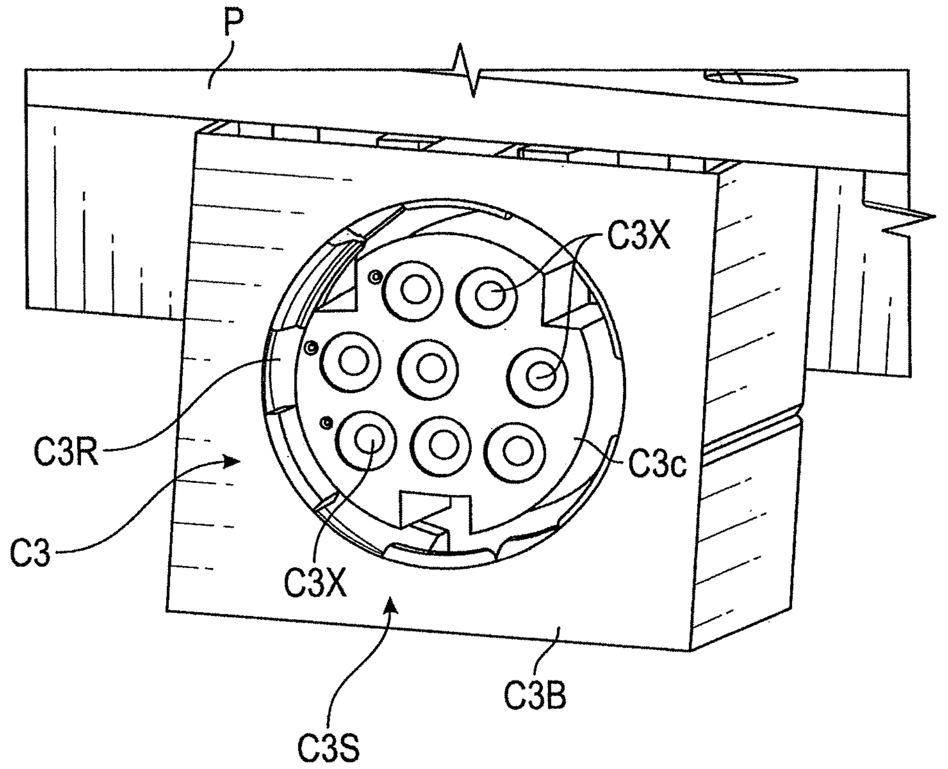
FIG. 3A illustrates a printed circuit board assembly including a third type of electrical connector.

As shown in FIG. 3A, the printed circuit board assembly P can further comprise one or more open or unused connectors C3 such as the illustrated 8 pin DIN connector or similar. The connector C3 is shown by itself in FIG. 3B and comprises a body C3B including a socket C3S including a central core C3C including metallic contacts C3X in the form of pin sockets. An annular space C3R defined between the central core C3C and the inside diameter of the socket C3S. As shown in FIG. 3C, a selectively installable and removable protective cover or cover device 310 formed in accordance with a third embodiment of the present development is engaged with each unused or open DIN connector C3 to protect the contacts C3X of the connector C3 from corrosion and other contamination due to environmental contaminants. The cover device 310 can be selectively removed from the connector C3 on which it is operatively installed for normal operative use of the connector C3.

Figure 3B:
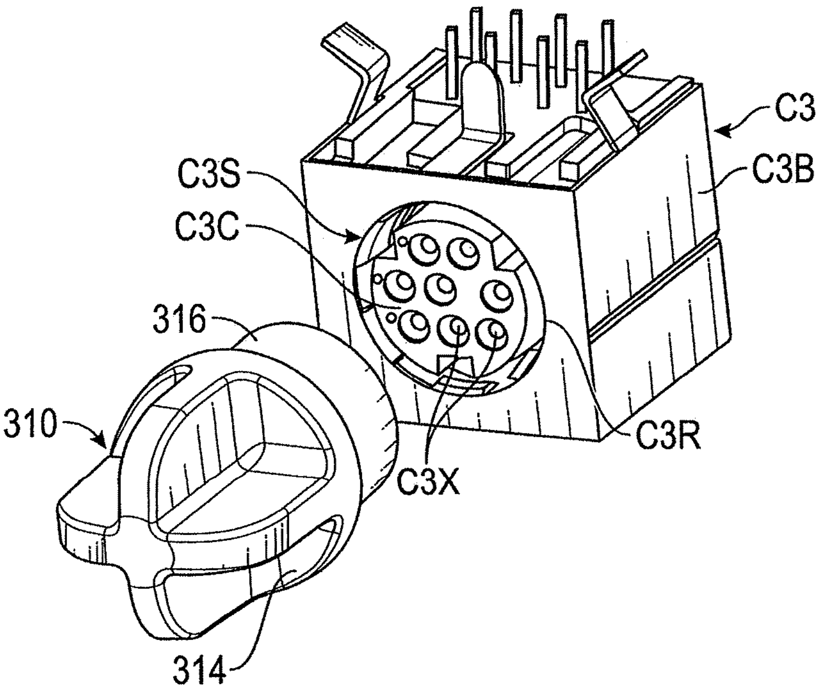
FIG. 3B is an exploded view that illustrates the third type of electrical connector of FIG. 3A and also shows a protective cover device formed in accordance with a third embodiment of the present development.
Figure 3C:
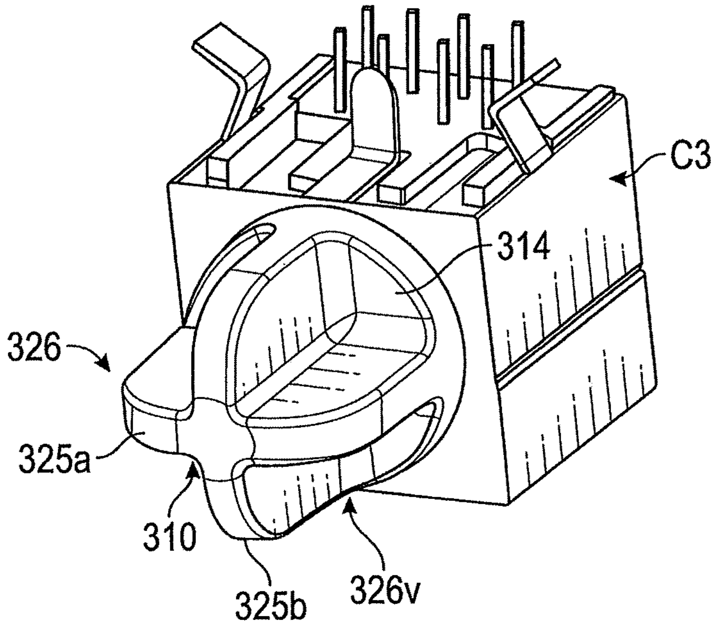
FIG. 3C is similar to FIG. 3B but shows the protective cover device operatively installed on the third type of electrical connector.
Figure 3D:
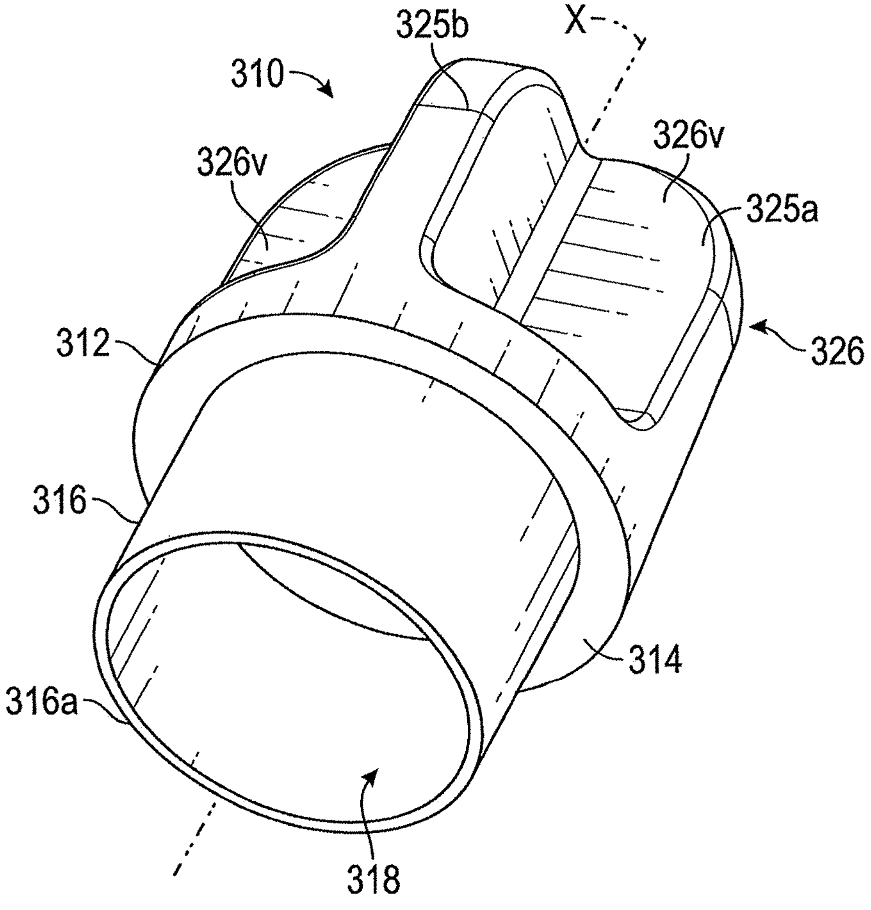
FIG. 3D provides an isometric view of the protective cover device of FIGS. 3B & 3C by itself.

The cover device 310 is shown separately in FIG. 3D and comprises a one-piece molded polymeric body 312 that is adapted to be releasably engaged with the connector C3 as shown in FIG. 3B. The body 312 includes a circular main wall 314 and a cylindrical skirt 316 that projects axially outward in a first direction from the main wall 314 along a longitudinal axis X of the cover. The skirt 316 comprises a cylindrical sidewall 316*a* centered on the longitudinal axis X. The cylindrical inside diameter of the sidewall 316*a* defines a cylindrical recess 318 that is closed at an inner end by the main wall 314 and that is open at an outer end.

When the cover device 310 is operatively mated with the connector C3 as shown in FIG. 3C, the cylindrical skirt sidewall 316*a* is closely received in the annular space C3R of the connector C3 and the main wall 314 of the cover abuts the central core 3C3 and covers the pin socket contacts C3X to protect same against corrosive compounds and other contaminants in the surround atmosphere. The skirt sidewall 316*a* is dimensioned to be closely receive in the annular space C3R with a sliding friction fit so that the cover 310 is frictionally but releasably retained in its operative installed position.

The edge connector cover device 310 preferably includes a grasping appendage or grip such as one or more fins or tabs that projects outwardly from the main wall 314 in a second direction opposite to that of the skirt 316. In the illustrated example, first and second perpendicularly intersecting fins or tabs 325*a*,325*b* are connected to the outer surface of the main wall 314 and are rounded at their respective outer edges to define a segmented crown structure 326 adapted to be manually grasped by a user to install and remove the cover 310 relative to the connector C3. To facilitate grasping of the cover device 310, the segmented crown structure 326 comprises at least four voids 326*v* defined between circumferentially successive fins 325*a*,325*b* that function as finger receiving or gripping locations and that are symmetrically arranged about the center of the crown structure 326 as defined by the point of intersection between the fins 325*a*, 325*b* at the longitudinal axis X.

Figure 4A:
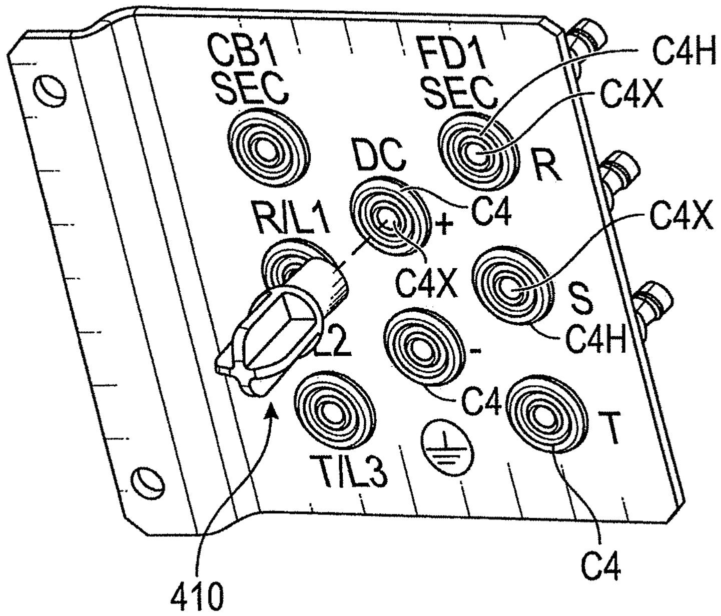
FIG. 4A is an exploded view that illustrates a printed circuit board assembly including a plurality of test point electrical contacts and shows a protective cover device formed in accordance with a fourth embodiment of the present development.
Figure 4B:
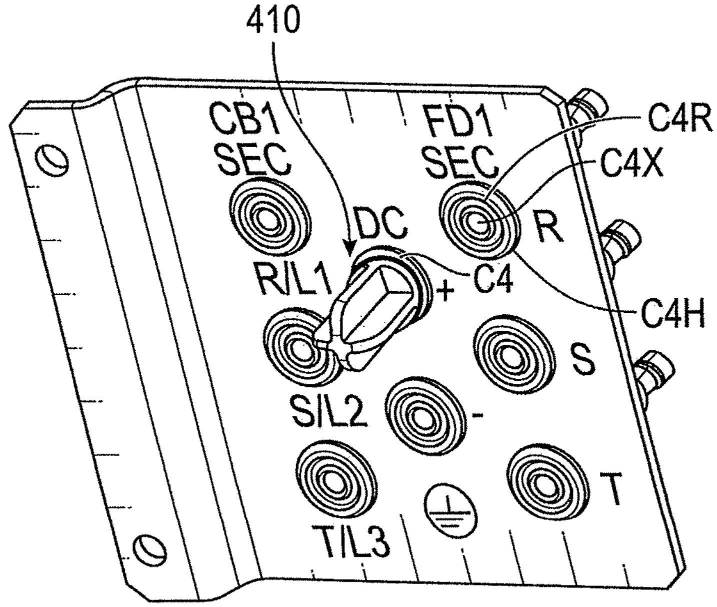
FIG. 4B is similar to FIG. 4A but shows the protective cover device operatively installed on a test point to protect same.

Referring now to FIGS. 4A-4D, the printed circuit board assembly P can further comprise one or more test points C4 that each comprise at least one metallic contact such as a central pin contact C4X and/or a metallic cylindrical outer housing C4H. The metallic contact(s) of each test point C4 is electrically connected to a select circuit of the printed circuit board assembly P and is adapted to be connected to associated testing systems to test the circuit. An annular space C4R is defined between the central pin contact C4X and the inside diameter of the housing C4H. As shown in FIGS. 4A & 4B, a selectively installable and removable protective cover or cover device 410 formed in accordance with a fourth embodiment of the present development is engaged with each unused or open test point C4 (FIG. 4B) to protect the contacts C4X and outer housing C4H thereof from corrosion and other contamination due to environmental contaminants. The cover device 410 can be selectively removed from the test point C4 on which it is operatively installed for normal operative use of the test point C4.

Figure 4C:
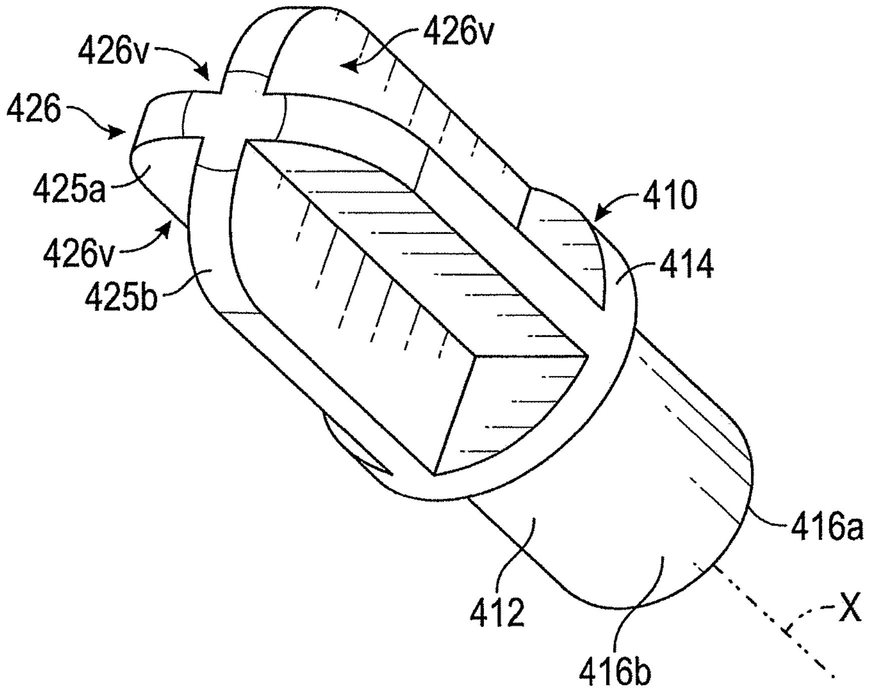
FIGS. 4C & 4D provide respective front and rear isometric views of the protective cover device of FIGS. 4A & 4B.
Figure 4D:
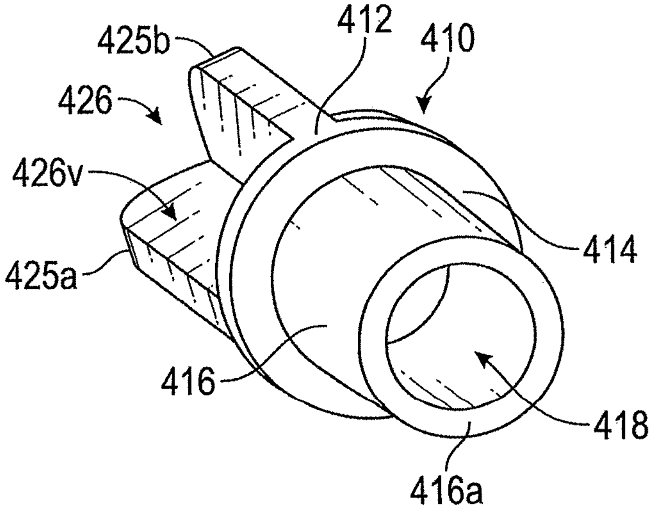

The cover device 410 is shown separately in FIGS. 4C and 4D and has a structure corresponding to the structure of the cover 310 described above, except that the cover device 410 is sized to operatively mate with a test point C4. The cover device 410 comprises a one-piece molded polymeric body 412 that is adapted to be releasably engaged with a test point C4 as shown in FIG. 4B. The body 412 includes a circular main wall 414 and a cylindrical skirt 416 that projects axially outwardly from the main wall 414 along a longitudinal axis X of the cover. The skirt 416 comprises a cylindrical sidewall 416*a* centered on a longitudinal axis X of the cover device 410. The cylindrical inside diameter of the sidewall 416*a* defines a cylindrical recess 418 that is closed at an inner end by the main wall 414 and that is open at an outer end.

When the cover device 410 is operatively mated with at test point C4 as shown in FIG. 4B, the cylindrical skirt sidewall 416*a* is closely received within the inside diameter of the cylindrical test point housing C4H (in the annular space C4R of the test point C4 surrounding the central pin contact C4X if the central pin contact C4X is present). When the cover 410 is installed, the main wall 414 of the cover seals the open outer end of the cylindrical housing C4H and abuts the central pin contact C4X to protect the pin contact and to protect the inside diameter of the cylindrical housing C4H against corrosive compounds and other contaminants in the surrounding atmosphere. The skirt sidewall 416*a* is dimensioned to be closely receive in the cylindrical housing C4H with a sliding friction fit so that the cover 410 is frictionally but releasably retained in its operative installed position.

The test point cover device 410 preferably includes a grasping appendage or grip such as one or more fins or tabs that project outwardly from the main wall 414 in a direction opposite to that of the skirt 416. In the illustrated example, first and second perpendicularly intersecting tabs 425*a*,425*b* are connected to the outer surface of the main wall 414 and are rounded at their respective outer edges to define a segmented crown structure 426 adapted to be manually grasped by a user to install and remove the cover 410 relative to the test point C4. To facilitate grasping of the cover device 410, the segmented crown structure 426 comprises at least four voids 426*v* defined between circumferentially successive fins 425*a*,425*b* that function as finger receiving or gripping locations and that are symmetrically arranged about the center of the crown structure 426 as defined by the point of intersection between the fins 425*a*, 425*b* at the longitudinal axis X.

Figure 5A:
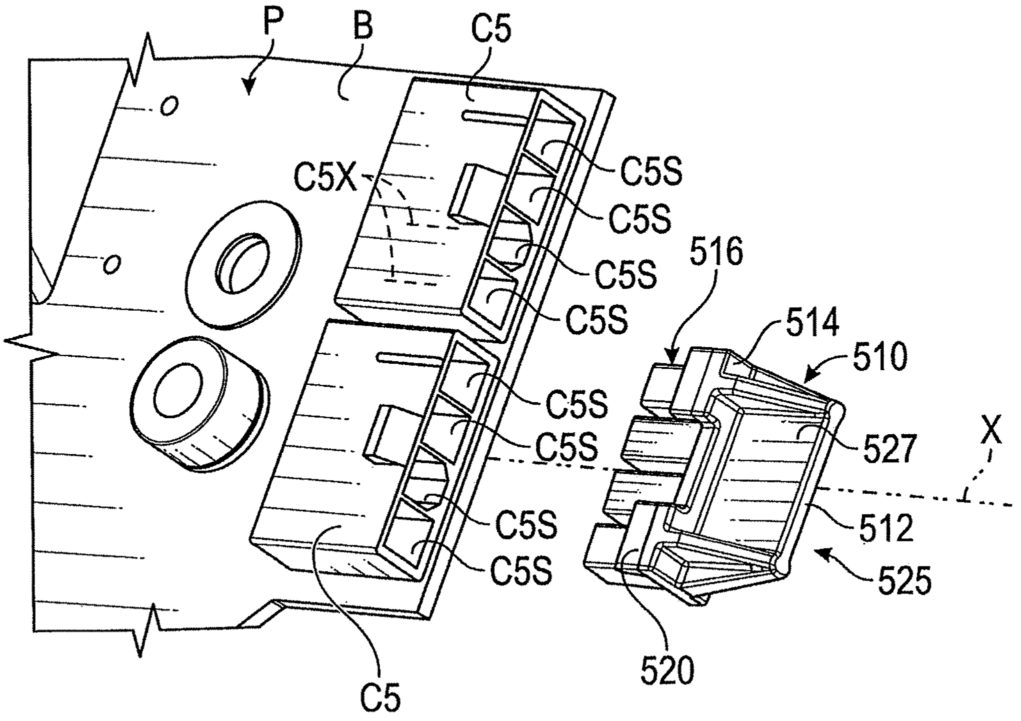
FIG. 5A is an exploded view that illustrates a printed circuit board assembly including a fifth type of electrical connector and a protective cover device formed in accordance with a fifth embodiment of the present development.
Figure 5B:
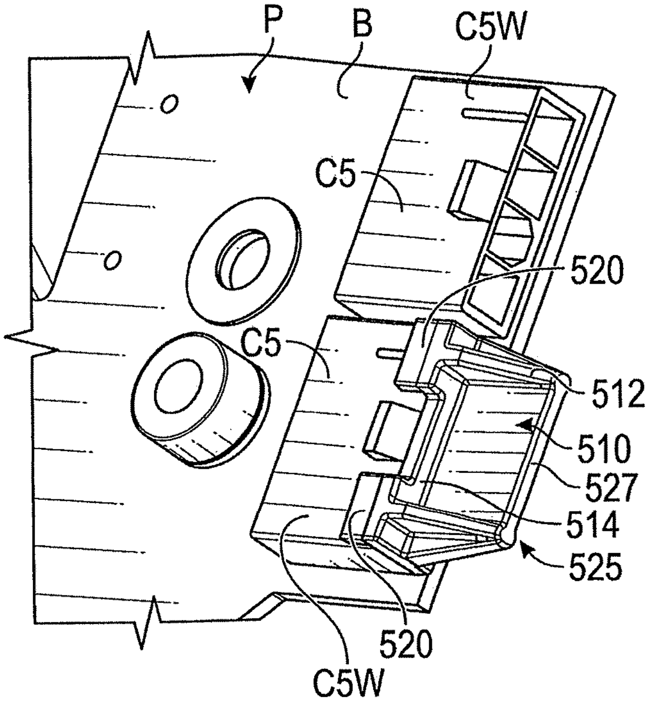
FIG. 5B is similar to FIG. 5A but shows the protective cover device operatively installed on the fifth type of electrical connector.
Figure 5C:
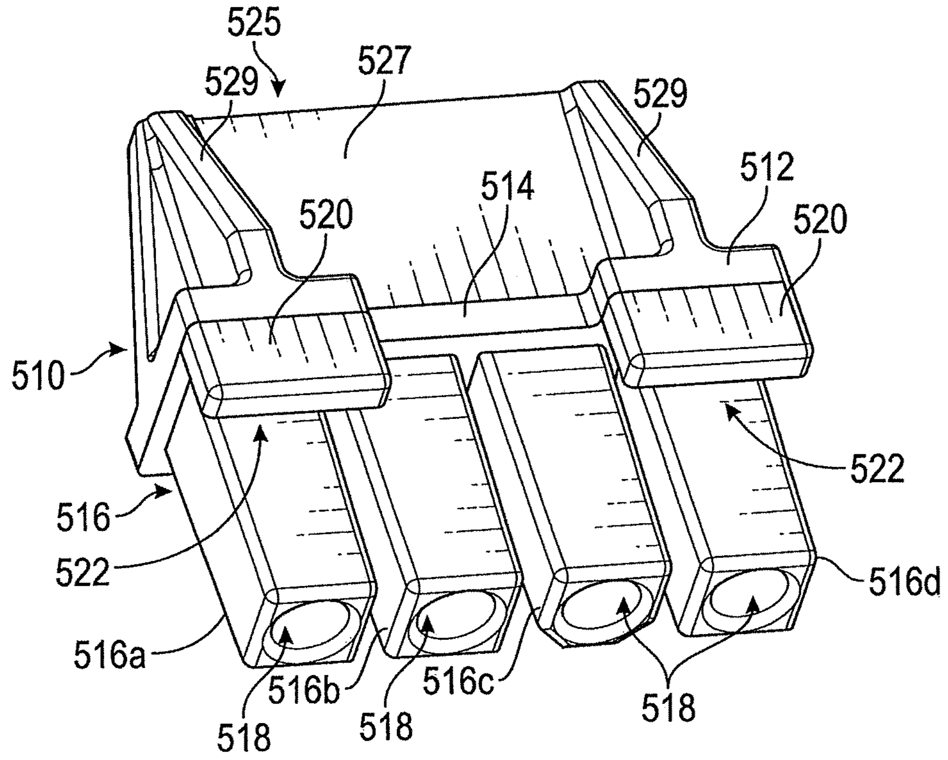
FIG. 5C is an isometric view of the protective cover device of FIGS. 5A & 5B by itself.

Referring now to FIGS. 5-5C, the printed circuit board assembly P can further comprise several different connectors C5 that comprises at least one row (only one shown in FIG. 5) of two or more sockets C5S wherein one or more of the sockets C5S defines a different cross-sectional shape relative to the others such that the connector is "keyed" and can only be mated with a corresponding male connector that is properly oriented. One or more of the sockets C5S includes a metallic electrical contact C5X located therein such as the illustrated contact pins C5X (as shown in broken lines in FIG. 5A) that are electrically connected to a select circuit of the printed circuit board assembly P. A selectively installable and removable protective cover or cover device 510 formed in accordance with a fifth embodiment of the present development is engaged with each unused or open connector C5 to protect the sockets C5S and the respective contacts C5X thereof from corrosion and other contamination due to environmental contaminants. The cover device 510 can be selectively removed from the connector C5 on which it is operatively installed for normal operative use of the connector C5.

The cover device 510 is shown separately in FIG. 5C comprises a one-piece molded polymeric body 512 that is adapted to be releasably engaged with a connector C5 as shown in FIG. 5B. The body 512 includes a main wall 514 and a plurality of two or more studs 516 (516*a*,516*b*,516*c*, 516*d* in the present example) that each project axially outward from the main wall 514 parallel to the longitudinal axis X of the cover device 510. All or at least some of the studs 516 include a central bore or recess 518 (FIG. 5C) that is closed at an inner end by the main wall 514 and that is open at an outermost end of each stud 516 and that is adapted to closely receive a corresponding one of the connector pin contacts C5X when the cover device 510 is operatively mated with the connector C5 as shown in FIG. 5B.

When the cover device 510 is operatively mated with a connector C5 as shown in FIG. 5B, the studs 516 are respectively closely received within connector sockets C5S and any contact pin C5X located in the connector socket C5S is received into the bore 518 of the inserted stud 516. The studs 516 are respectively conformed and dimensioned with the required cross-sectional shape to mate properly with the respective connector sockets C5S. In particular, one or more of the studs (studs 516*a*, 516*b*, 516*d* in the present example) defines a rectangular cross-sectional shape to be closely received in a corresponding socket C5S having a rectangular cross-section, while one or more of the studs (studs 516*c* in the present example) defines a select, non-rectangular polygonal cross-sectional shape such as the illustrated irregular hexagonal shape to be closely received in a corresponding socket C5S having the same select cross-sectional shape. When the cover 510 is operatively mated with the connector C5, the studs 516 fill the connector sockets C5S and cover any contact pins C5X located therein to prevent corrosion of the contact pins C5X and the studs and main wall 514 block the open sockets C5S to prevent any contamination of the sockets C5S. When operatively mated with the connector C5, the cover is frictionally engaged with the connector C5 so that it is releasably retained in its operatively installed position. In one example, the studs 516 are sized to frictionally engage the sidewalls of the sockets C5S. In another example, the cover device 510 includes one or more retaining tabs 520 connected to and projecting outwardly from a peripheral edge of the main wall 514. The or each retaining tab 520 extends axially alongside or adjacent but spaced from at least one of the studs 516 so that a connector engagement slot 522 (FIG. 5C) is defined between the retaining tab 520 and one or more of the studs 516. When the cover 510 is operatively mated with the connector C5 as shown in FIG. 5B, part of a wall C5W of the connector C5 is received in the connector engagement slot 522 with a friction fit to releasably frictionally secure the cover 510 to the connector C5.

The cover device 510 preferably includes a grasping appendage or grip 525 such as a primary fin 527 that project outwardly from the main wall 514 in a direction opposite to that of the studs 516. The grip 525 can optionally further include one or more support gusset fins 529 that intersect the primary fin 527 adjacent its opposite ends. A user can grasp the cover device 510 by way of the grip 525 to install and remove the cover device 510 relative to an associated connector C5.

Figure 6A:
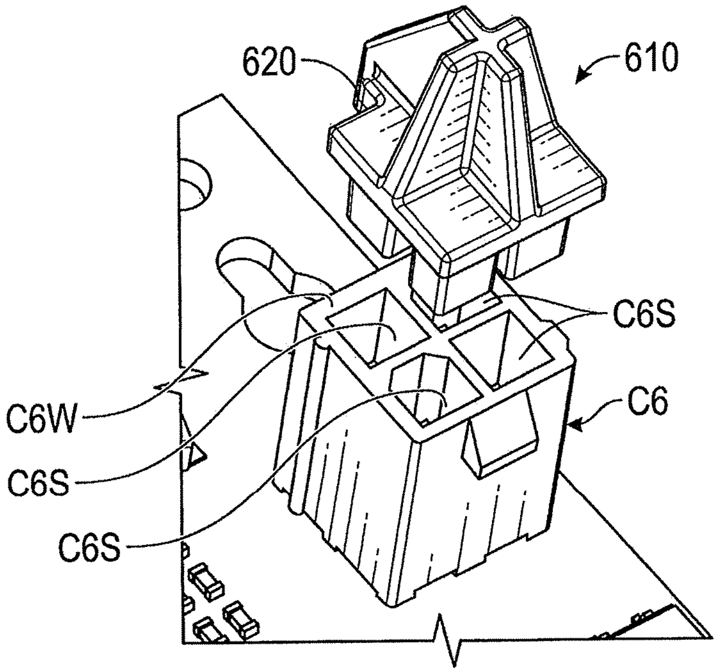
FIG. 6A is an exploded view that illustrates a printed circuit board assembly including a sixth type of electrical connector and a protective cover device formed in accordance with a sixth embodiment of the present development.
Figure 6B:
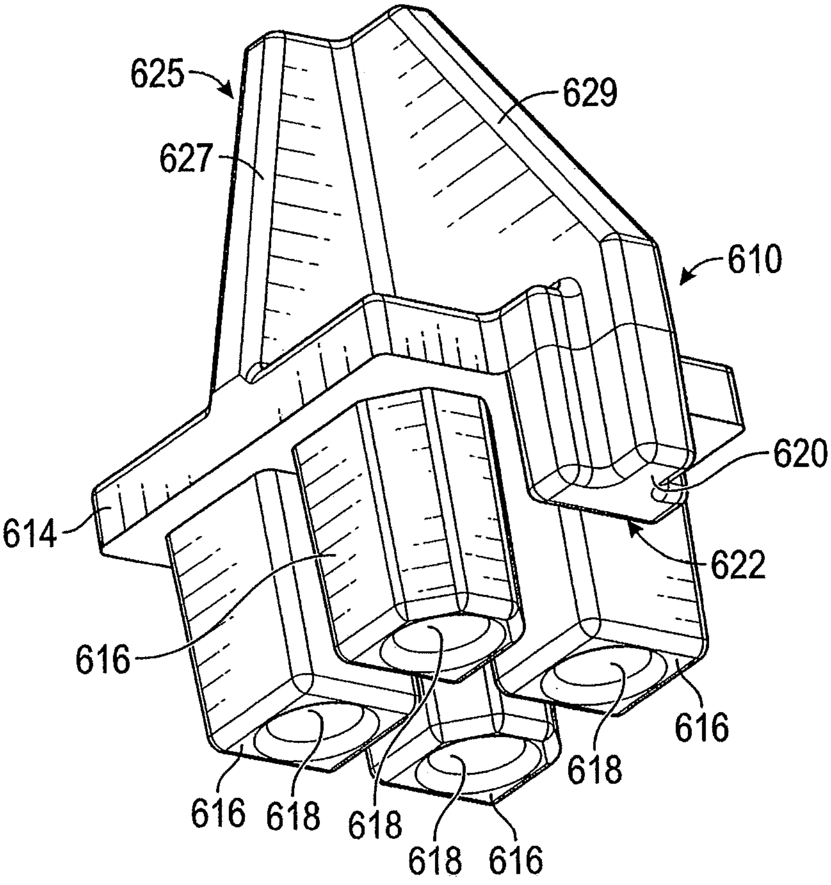
FIG. 6B provides an isometric view of the protective cover device of FIG. 6A.

FIG. 6A shows that the printed circuit board assembly P can include a connector C6 that is similar to the connector C5 except that it includes two rows of sockets C6S rather than a single row of sockets C5S for the connector C5. The connector C6 includes a wall C6W adjacent the sockets C6S. FIG. 6A also illustrates a cover device 610 (shown separately in FIG. 6B) that is similar to the cover device 510 but that includes two rows of studs 616 rather than the single row of studs 516 for the cover device 510. Corresponding structures of the cover device 610 relative to the cover device 510 are correspondingly numbered using reference numbers that are 100 greater than those used to describe the cover device 510 and such structures are not described further here.

Figure 7A:
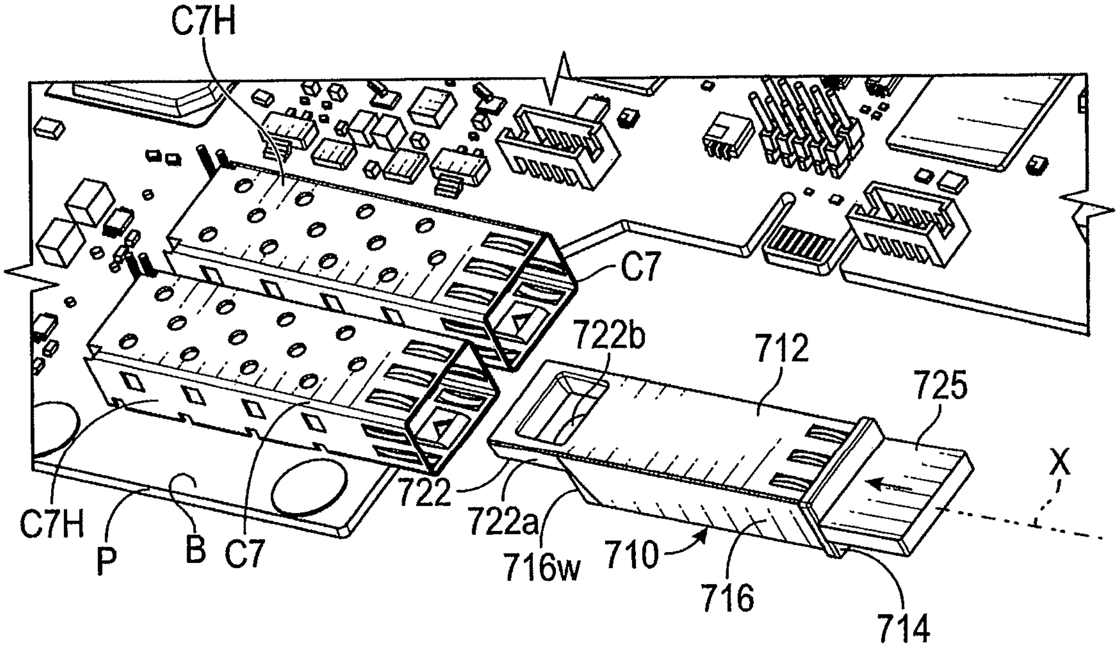
FIG. 7A is an exploded view that illustrates a printed circuit board assembly including a fiber optic transceiver including a seventh type of electrical connector and illustrates a protective cover device formed in accordance with a seventh embodiment of the present development.
Figure 7B:
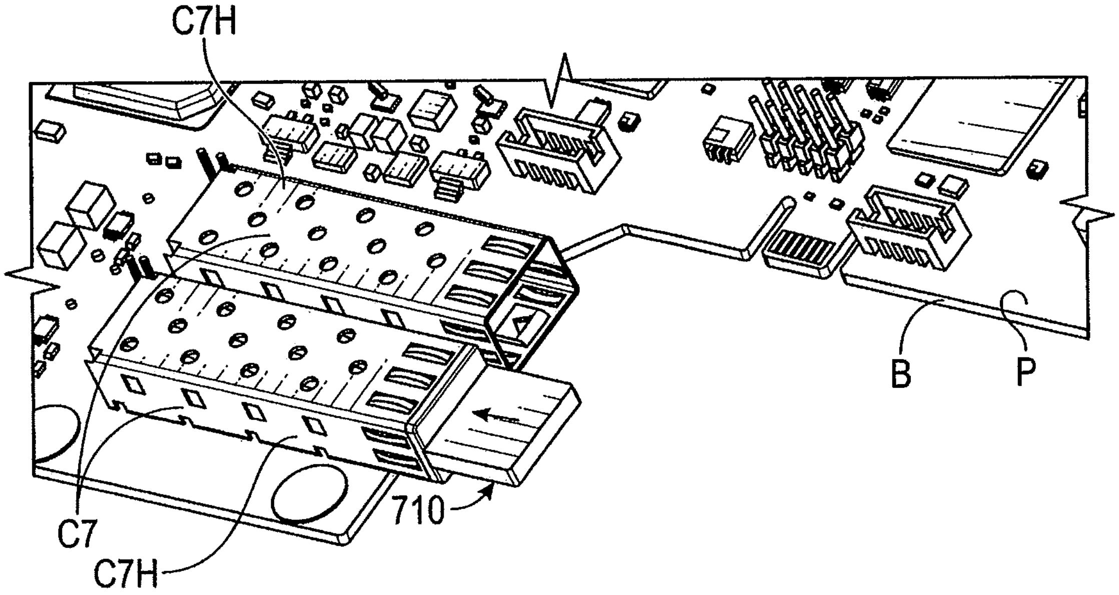
FIG. 7B is similar to FIG. 7A but shows the protective cover device operatively installed on the fiber optic transceiver and mated with the seventh type of electrical connector.
Figure 7C:
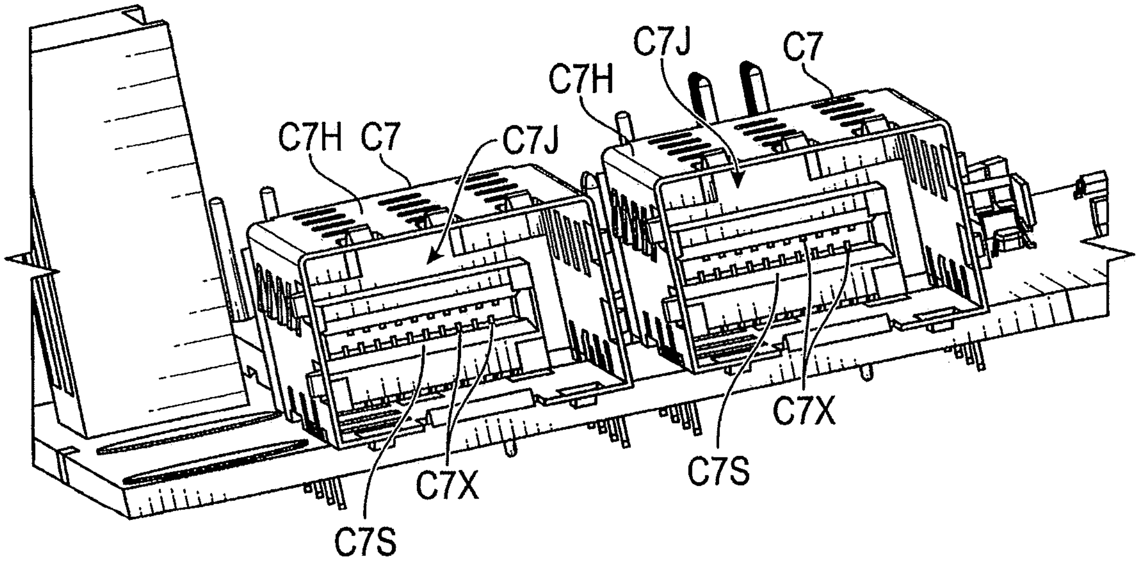
FIG. 7C shows an end view of the fiber optic transceiver and the internal electrical connector.

As shown in FIGS. 7A-7C, the printed circuit board assembly P can further comprise one or more open (unused) fiber optic transceiver connectors C7. As shown in FIG. 7C, each connector C7 comprises an elongated electromagnetic interference (EMI) shield or cage housing C7H that defines an internal rectangular channel or socket C7J that is closed at an inner end of the housing C7H and open at an outer end of the housing C7H. A connector slot C7S (FIG. 7C) is located in the socket C7J adjacent the inner end of the housing C7H and includes multiple metallic electrical contacts C7X for mating with a fiber optic transceiver that can be installed in the channel C7J.

As shown in FIGS. 7A & 7B, a selectively installable and removable protective cover or cover device 710 formed in accordance with an embodiment of the present development is mated or engaged with each unused or "open" fiber optic transceiver connector C7 to protect the housing C7H and also the internal connector slot C7S and its contacts C7X from corrosion and other contamination due to environmental contaminants in the ambient atmosphere. The cover device 710 can be selectively removed from the connector C7 for normal operative use of the connector C7.

Figure 7D:
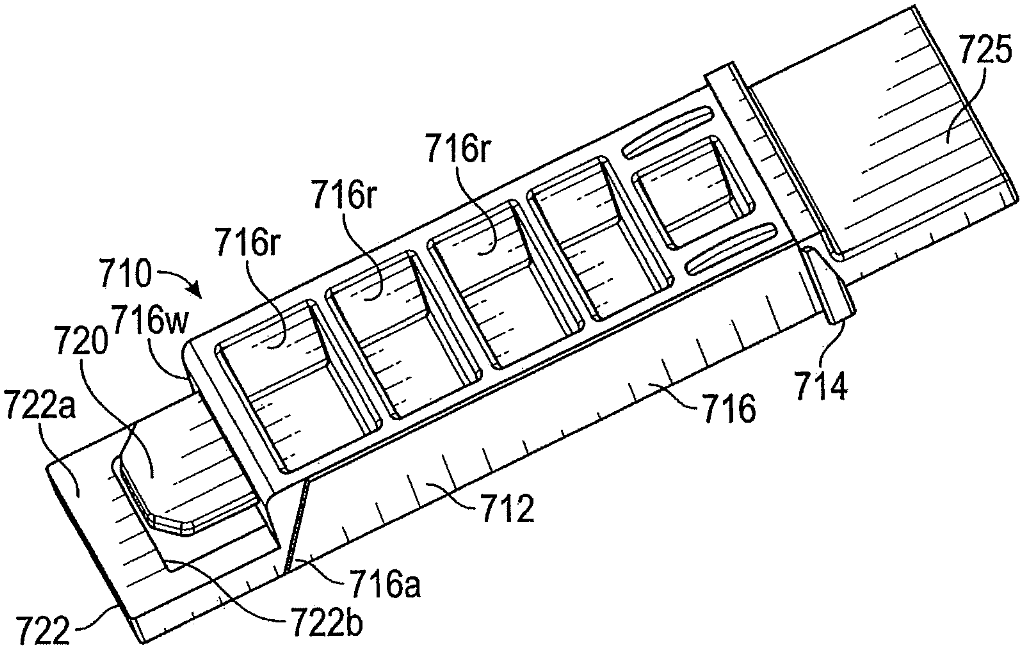
FIG. 7D is an isometric vi of the protective cover device of FIGS. 7A & 7B by itself.

The cover device 710 is shown separately in FIG. 7D and comprises a one-piece molded polymeric body 712 that is adapted to be releasably engaged with a connector C7 as shown in FIG. 7B. The body 712 includes a main wall 714 and an elongated projecting portion or stud 716 projects axially outward from the main wall 714 parallel a longitudinal axis X of the cover device 710. The elongated stud 716 is conformed and dimensioned to tit closely inside the socket C7J of the housing C7H. In the illustrated example, the socket C7J and stud 716 each have a rectangular cross-section. The stud 716 preferably includes one or more open recesses 716*r* such as the illustrated open rectangular recesses formed along its axial length to reduce material usage and to facilitate injection molding. An outer end 716*a* of the stud 716 spaced outwardly away from the main wall 714 includes a transverse end wall 716*w* and a flat tab 720 projects outwardly from the end wall 716*w*. In use, the flat tab 720 is oriented parallel to the circuit board B and that is sized and shaped to fit closely inside the connector slot C7S of the connector C7 when the cover device 710 is fully inserted into the housing C7H, The cover device 710 preferably also includes a guide member 722 that projects outwardly from the outer end 716*a* of the stud 716 and that lies parallel but spaced-apart from the tab 720. As shown herein, the guide member 722 comprises a rectangular wall 722*a* with an opening 722*b* formed therein.

When the cover device 710 is inserted into the connector socket C7J for operatively mating with the connector C7, the guide member 722 is received between the connector slot C7S and the housing C7H and aligns the tab 720 with the connector slot C7S to facilitate insertion of the tab 720 in the slot C7S. When the cover device 710 is operatively mated with a connector C7 as shown in FIG. 7B, the stud 716 is closely received within the housing socket C7J and the tab 720 is received in the connector slot C7S to fill the slot C7S and to cover and protect the contacts C7X to prevent corrosion and/or contamination of the contacts C7X. The transverse end wall 716*w* of the stud 716 lies adjacent and abuts the connector slot C7S to further block same and prevent entry of gaseous or particulate contamination into the slot C7S. The stud 716 closely fills the channel C7J to protect the inner surface of the housing C7H and the main wall 714 abuts the open outer end of the housing C7H to block same. The tab 720 is frictionally engaged with the slot C7S and/or the stud 716 is frictionally engaged with the housing C7H such that the cover device 710 is frictionally releasably retained in its installed operative position as shown in FIG. 7B when the cover 710 is operatively mated with the connector C7.

The cover device 710 preferably includes a grasping appendage or grip 725 such as a fin 727 that project outwardly from the main wall 714 in a direction opposite to that of the stud 716. A user can grasp the cover device 710 by way of the grip 725 to install and remove the cover device 710 relative to an associated connector C7.

Figure 8A:
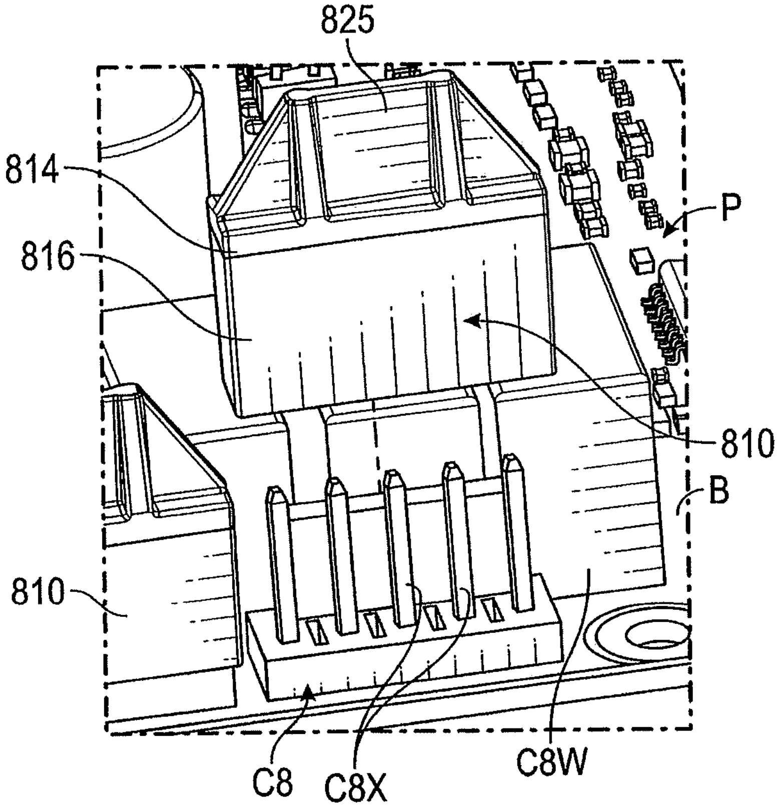
FIG. 8A is an exploded view that illustrates a printed circuit board assembly including an eighth type of electrical connector and a protective cover device formed in accordance with an eighth embodiment of the present development.
Figure 8B:
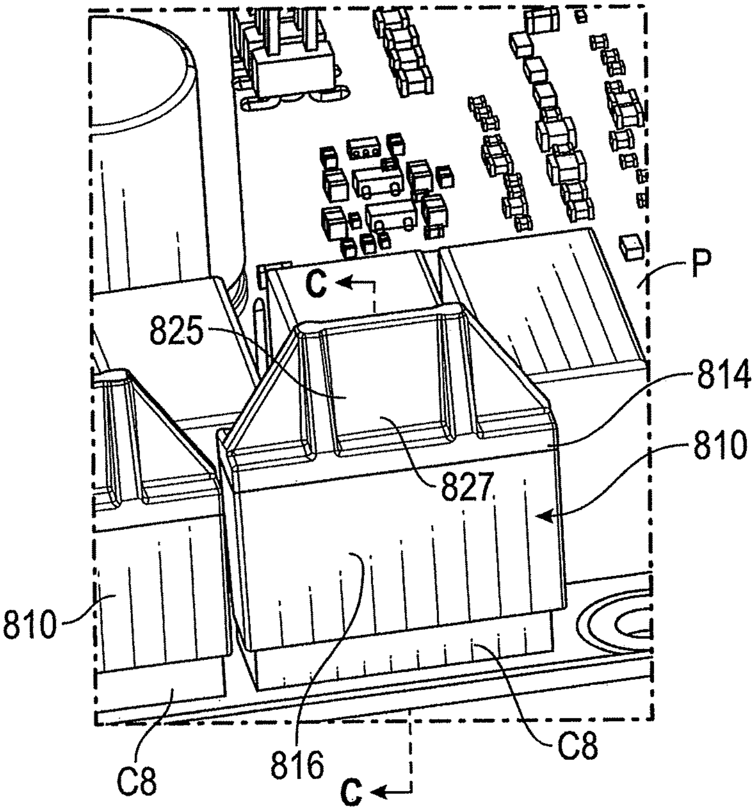
FIG. 8B is similar to FIG. 8A but shows the protective cover device operatively installed on the eighth type of electrical connector.

As shown in FIGS. 8A & 8B, the printed circuit board assembly P can further comprise one or more open (unused) pin connectors C8 of various types that include one or more projecting metallic pin contacts C8X that can be optionally protected by one or more adjacent walls C8W that can surround the pin(s) C8X and form a socket around the pins C8X. As shown in FIG. 8, only a single wall C8W is provided adjacent the pin contacts C8X. According to an embodiment of the present development, a selectively installable and removable protective cover or cover device 810 formed in accordance with an embodiment of the present development is mated or engaged with each unused or "open" pin connector C8 (see also the section view of FIG. 8C) to protect the contacts C8X thereof from a corrosive atmosphere or other contaminates. The cover device 810 can be selectively removed from the connector CS for normal operative use of the connector C8.

Figure 8C:
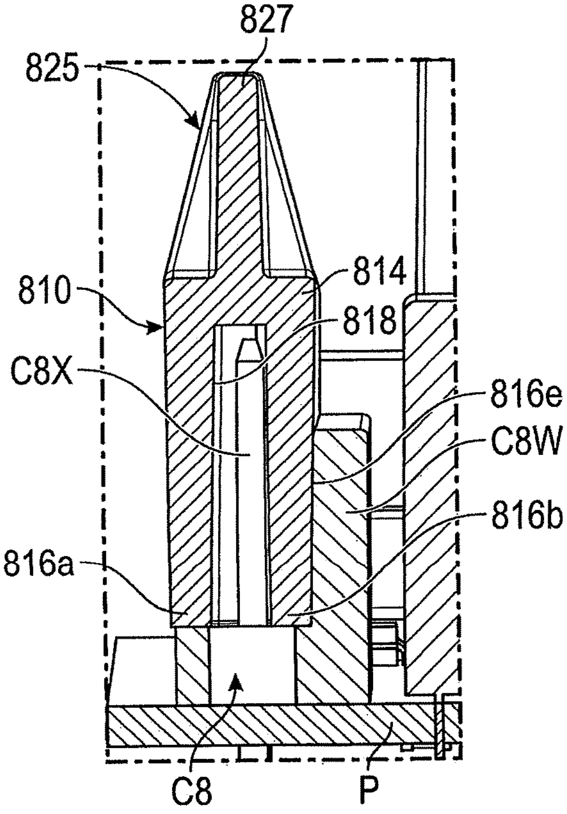
FIG. 8C is a section view taken at line C-C of FIG. 8B.
Figure 8D:
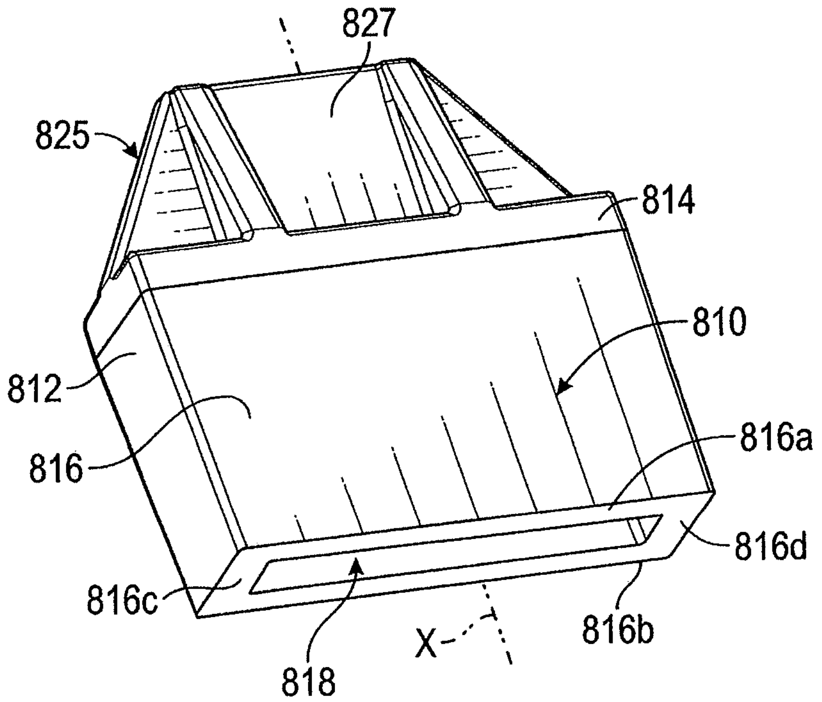
FIG. 8D is an isometric view of the protective cover device of FIGS. 8A & 8B by itself.

The cover device 810 is shown separately in FIG. 8D and comprises a one-piece molded polymeric body 812 that is adapted to be releasably engaged with a connector C8 as shown in FIG. 8B and the section view of FIG. 8C. The body 812 includes a main wall 814 and an elongated skirt 816 projects axially outward from the main wall 814 parallel a longitudinal axis X of the cover device 810. The skirt 816 is generally rectangular in configuration and comprises first and second parallel, spaced-apart sidewalk 816*a*,816*b* and first and second parallel, spaced-apart end walls 816*c*,816*d* that extend between and interconnect the first and second sidewalls 816*a*,816*b* such that an open recess 818 is defined by the skirt 816 and the main wall 814. The recess 818 is closed at an inner end by the main wall 814 and open at its opposite outer end spaced from the main wall 814.

When the cover device 810 is operatively mated with the connector C8 as shown in FIG. 2B, pin contacts C8X of the connector C8 are fully received in the recess 818 so as to be completely covered by the skirt 816 and main wall 814. In one embodiment, the recess 818 is dimensioned to receive the pin contacts C8X with a sliding friction fit so that the cover device 810 is frictionally releasably retained in its operative position. In the illustrated embodiment, one or more walls 816*a*-816*d* are conformed and dimensioned so that the outer surface 816*e* thereof (see outer surface 816*e* o wall 816*b* in FIG. 8C) frictionally slidably engages one or more the walls C8W located adjacent the pin contacts C8X for releasably frictionally retaining the cover device 810 in its operative position. In another alternative embodiment, the body 812 of the cover device 810 further comprises one or more walls that span the recess between the first and second side walls 816*a*,816*b* to divide the recess 818 into multiple separated recesses that each receive one or more than one of the pin contacts C8X.

The cover device 810 preferably includes a grasping appendage or grip 825 such as a fin 827 that project outwardly from the main wall 814 in a direction opposite to that of the skirt 816. A user can grasp the cover device 810 by way of the grip 825 to install and remove the cover device 810 relative to an associated connector C8.

Figure 9A:
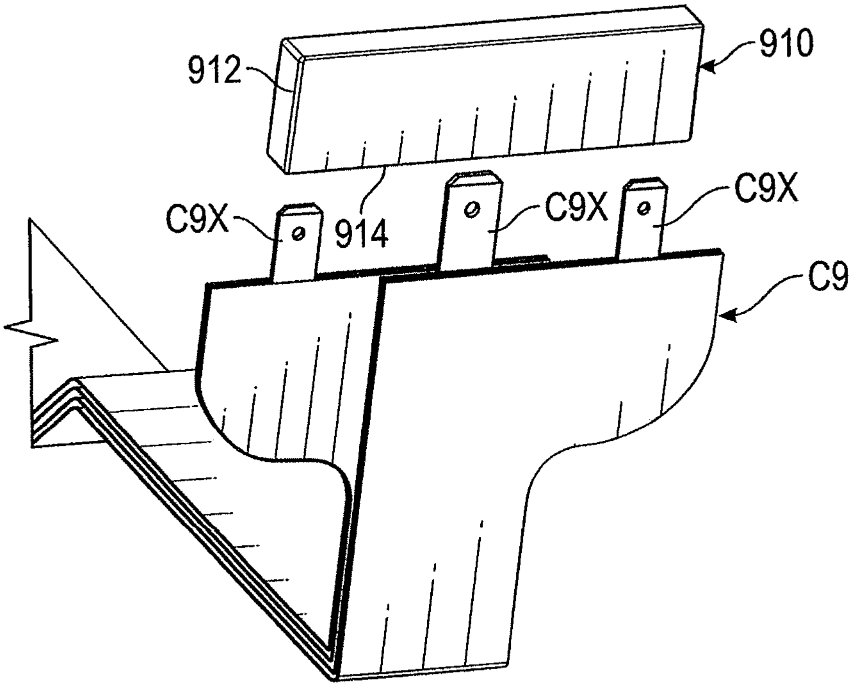
FIG. 9A is an exploded view that illustrates a ninth type of electrical connector that can be provided as part of a printed circuit board assembly or other electrical component and also illustrates a protective cover device formed in accordance with an ninth embodiment of the present development.
Figure 9B:
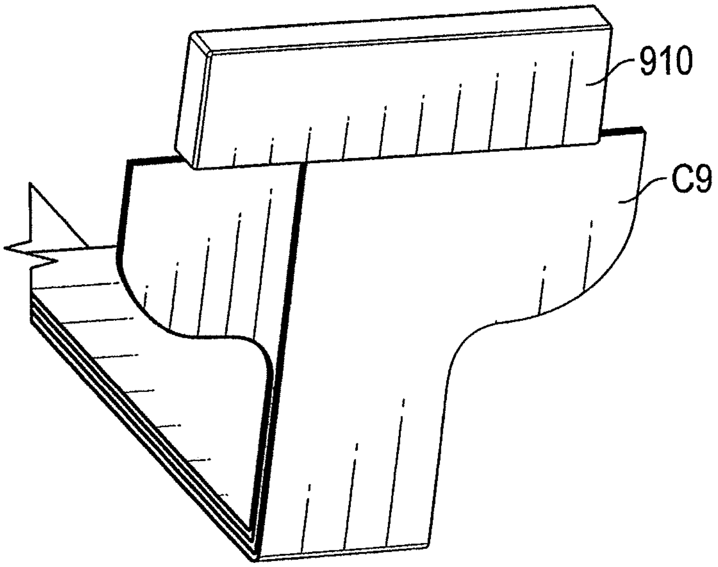
FIG. 9B is similar to FIG. 9A but shows the protective cover device operatively installed on the ninth type of electrical connector.

As shown in FIGS. 9A & 9B, the printed circuit board assembly P can further comprise one or more open (unused) metallic blade connectors such as the illustrated multi-contact blade connector C9 that includes more than one projecting blade contact C9X (such as three contacts C9X in the illustrated example). According to an embodiment of the present development, a selectively installable and removable protective cover or cover device 910 formed in accordance with an embodiment of the present development is mated or engaged with each unused or "open" blade connector C9 to protect the contacts C9X thereof from a corrosive atmosphere or other contaminates. The cover device 910 can be selectively removed from the connector C9 for normal operative use of the connector C9.

Figure 9C:
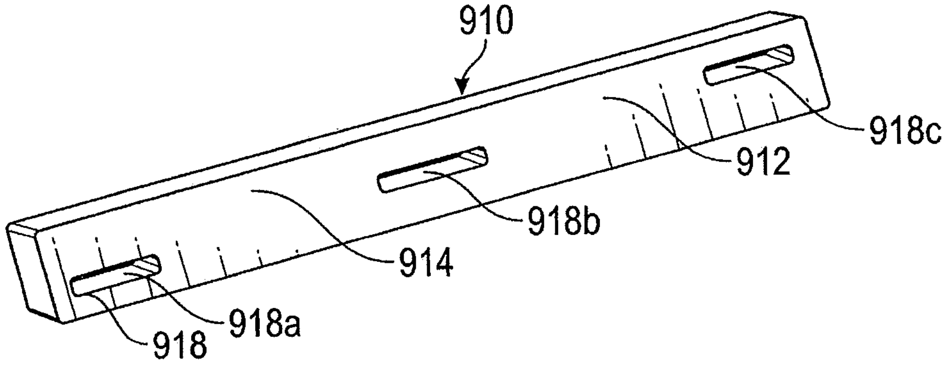
FIG. 9C is an isometric view of the protective cover device of FIGS. 9A & 9B by itself.

The cover device 910 is shown separately in FIG. 9C and comprises a one-piece molded polymeric body 912 that is adapted to be releasably engaged with a connector C9 as shown in FIG. 9B. The body 912 includes a main wall 914 that defines at least one recess or slot 918 for fully receiving and covering the blade contacts C9X. In the illustrated example, the main wall 914 includes multiple separate recesses or slots 918 (918*a*,918*b*,918*c*) that correspond in size, number, and location to the size, number, and location of the contacts C9X and that respectively receive the individual connector contacts C9X with a close sliding frictional fit to protect and prevent corrosion or other contamination of the contacts C9X.

Figure 10A:
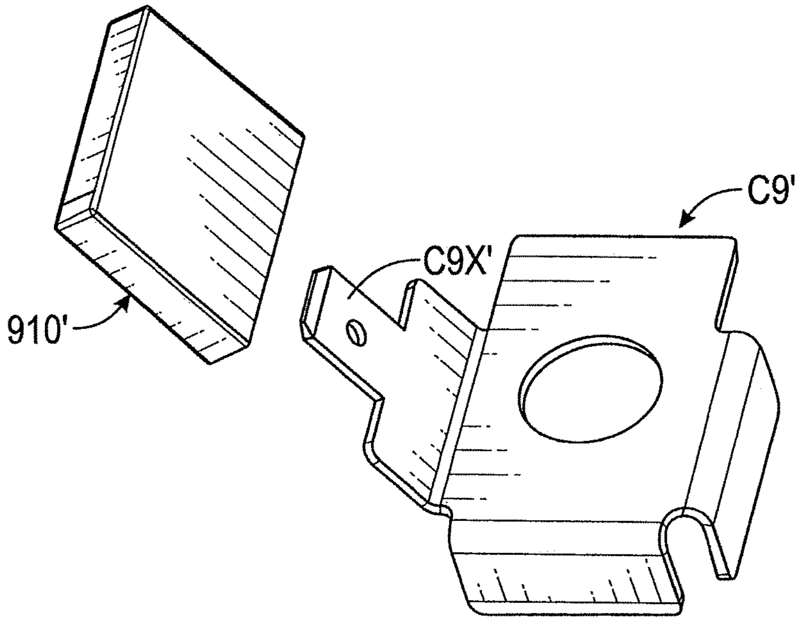
FIG. 10A is an exploded view that illustrates a tenth type of electrical connector that can be provided as part of a printed circuit board assembly or other electrical component and also illustrates a protective cover device formed in accordance with a tenth embodiment of the present development.
Figure 10B:
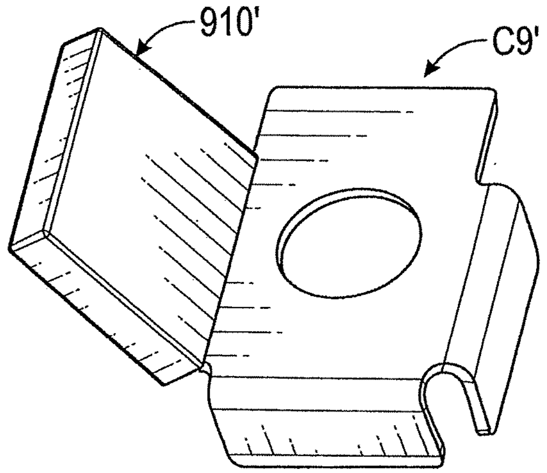
FIG. 10B is similar to FIG. 10A but shows the protective cover device operatively installed on the tenth type of electrical connector.
Figure 10C:
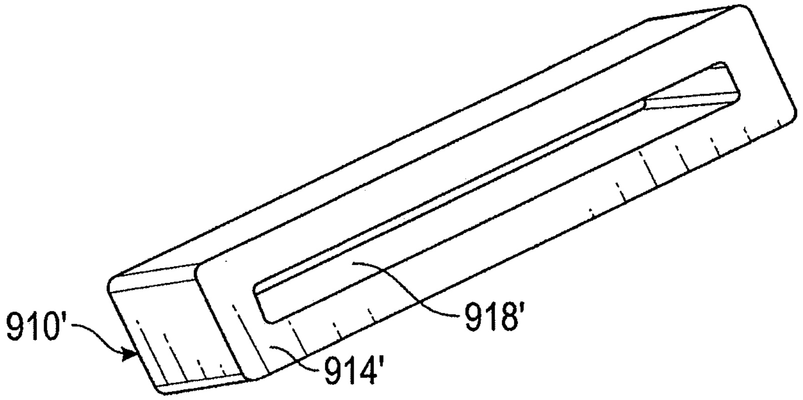
FIG. 10C is an isometric view of the protective cover device of FIGS. 10A & 10B by itself.

FIGS. 10A, 10B, and 10C show a cover device 910' that is substantially identical to the cover device 910 except and otherwise shown and/or described herein. The cover device 910' is adapted to mate with and protect a single-contact blade connector C9' that includes one projecting blade contact C9X'. Like structures of the cover device 910' relative to the cover device 910 are identified with like reference identifiers that include a primed (') designation and are not necessarily described again. Unlike the illustrated cover device 910 in FIGS. 9A-9C, the cover device 910' includes only a single recess or slot 918' that is dimensioned to receive the single contact C9X' with a close sliding friction fit to protect the contact C9X' from the effects of a corrosive or contaminative atmosphere.

Figure 11A:
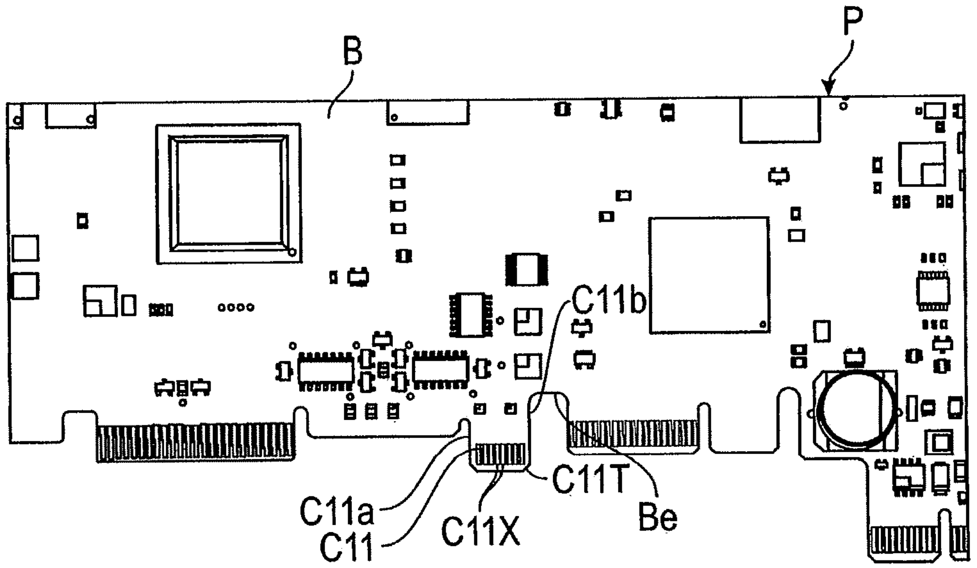
FIG. 11A illustrates a printed circuit board assembly including an eleventh type of electrical connector.
Figure 11B:
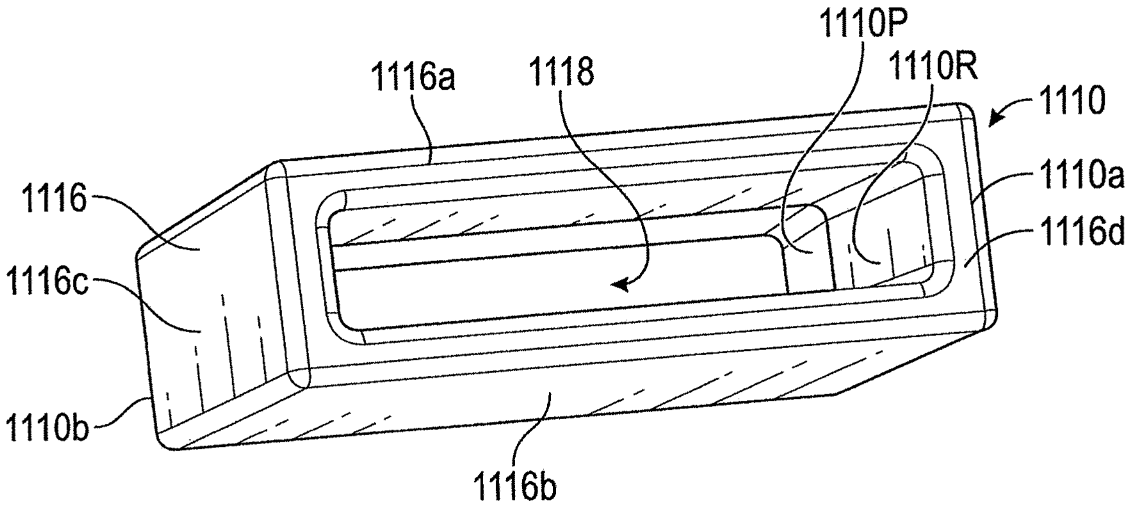
FIG. 11B is an isometric view of a protective cover device adapted to mate with and protect the eleventh type of electrical connector of FIG. 11A.
Figure 11C:
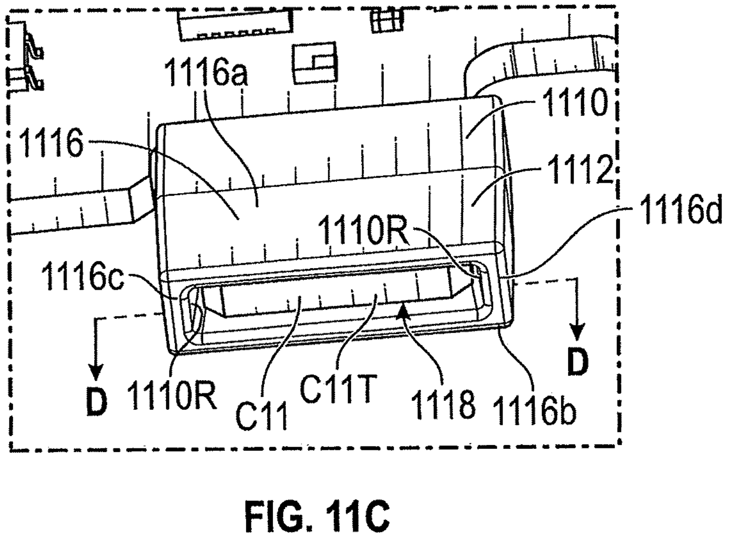
FIG. 11C is shows the protective cover device of FIG. 11B operatively installed on the eleventh type of electrical connector of FIG. 11A.
Figure 11D:
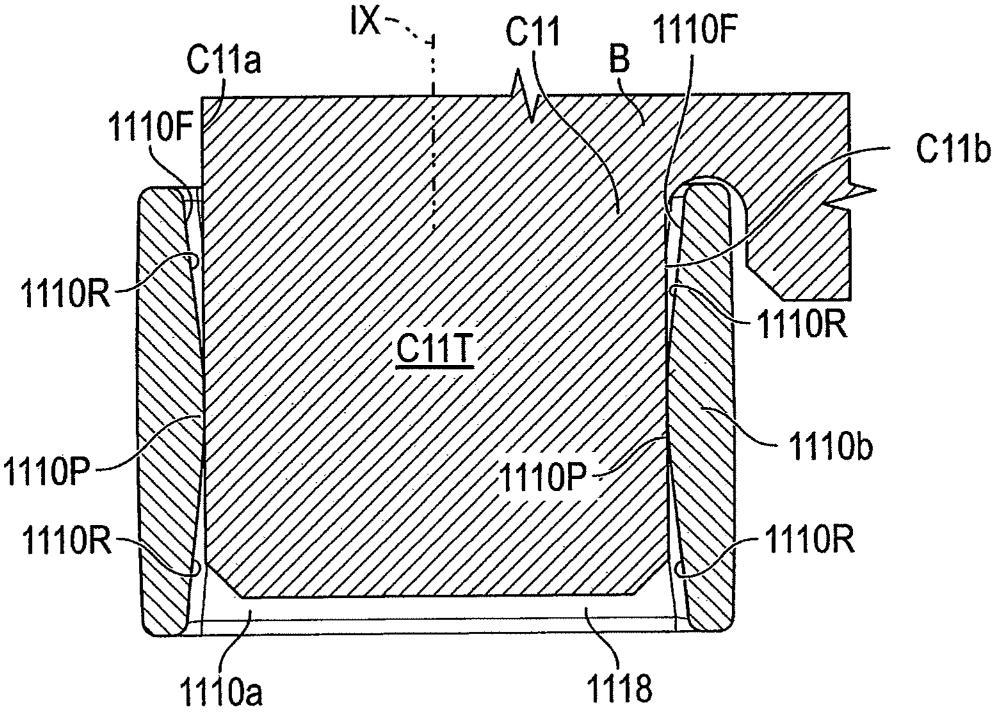
FIG. 11D is a section view as taken at line D-D of FIG. 11C.

As shown in FIGS. 11A-11D, the printed circuit board assembly P can comprise one or more open or unused edge connectors C11. A selectively installable and removable protective cover or cover device 1110 formed in accordance with an embodiment of the present development is engaged with each unused or open edge connector C11 (as shown in FIGS. 11C & 11D) to protect the edge connector C11 from corrosion and other contamination due to environmental contaminants. The cover device 1110 can be selectively removed from the edge connector C11 on which it is operatively installed for normal operative use of the edge connector C11.

Each edge connector C11 comprises at least one projecting tab C11T that projects outwardly from a peripheral edge Be of the circuit board B in the plane of the circuit board B thereof. The edge connector tab C11T comprises a plurality of metallic electrical contacts C11X that are adapted to contact and mate electrically with respective corresponding metallic electrical contacts of an associated mating slot connector into which the edge connector C11 is adapted to be releasably received. The edge connector tab C11T includes first and second lateral edges C11*a*,C11*b* respectively located on opposite first and second lateral sides that are each linear and that are arranged parallel to each other and parallel to the insertion axis IX along which the connector C11 is mated with a corresponding connector.

To avoid the above-described degradation of any unused or "open" connectors C11, the cover device 1110 is operatively engaged with each unused connector C11 as shown in FIGS. 11C & 11D and protects the contacts C11X thereof from corrosion or contamination. The cover device 1110 can be selectively removed from the connector C11 on which it is operatively installed for normal operative use of the connector C11. The cover device 1110 is shown separately in FIG. 11B and comprises a one-piece molded polymeric body 1112 that is adapted to be releasably engaged with the edge connector C11 as shown in FIGS. 11C & 11D. The body 1112 includes a skirt 1116 defined by first and second spaced-apart sidewalls 1116*a*,1116*b* and first and second spaced-apart end walls 1116*c*,1116*d* that extend between and interconnect the first and second sidewalls 1116*a*,1116*b* such that an open recess 1118 is defined by the skirt 1116 between the sidewalls 1116*a*,1116*b* and end walls 1116*c*,1116*d*. The recess 1118 opens through opposite first and second axial ends 1110*a*,1110*b* of the cover device 1110 such that the recess comprises open first and second ends. The recess 1118 is sized and shaped to fit over the connector C11 with a close sliding fit along the insertion axis IX so that the sidewalls 1116*a*,1116*b* respectively cover the contacts C11X located on opposite first and second faces of the connector tab C11T. When fully operatively installed on a connector C11, the sidewalls 1116*a*,1116*b* cover at least the contacts C11X but optionally cover the entire tab C11T such that no part of the tab C11T projects outwardly from the recess 1118.

With specific reference to the section view of FIG. 11D, at least one of the end walls 1116*c*,1116*d* comprises and preferably both end walls 1116*c*,11116*d* comprise) an internal lock face 1110F on its inner surface oriented inwardly toward the recess 1118 (toward the opposite end wall 1116*c*,1116*d*). As shown herein, the first and second end walls 1116*c*,116*d* comprise respective lock faces 1110F oriented inwardly toward the recess 1118. Each lock face 1110F comprises a region that projects inwardly toward the recess 1118 relative to an adjacent surface so as to be adapted to frictionally engage a respective lateral edge C11*a*,C11*b* of the connector 1110 when the cover 1110 is slidably installed on the connector C11. In the illustrated embodiment, each lock face 1110F comprises first and second ramp surfaces 1110R that extend inwardly toward the opposite end wall 1116*c*,1116*d* (deeper into the recess 1118) as they extend axially inwardly toward each other from the opposite axial ends 1110*a*,1110*b* of the cover device 1110. A peak 1110P is defined where the ramp surfaces 1110R intersect. As such, the end walls 1110*c*,1110*d* have a variable thickness as shown in FIG. 11D comprising a greater thickness in the region of the peak 1110P as compares to the thickness adjacent the opposite outer and inner axial ends 1110*a*,1110*b* of the cover device 1110. The lock faces 1110F are preferably symmetrically defined as shown such that the protective cover device 1110 can be installed on the connector tab C11T by way of either of the opposite open ends of the recess 1118.

Figure 12A:
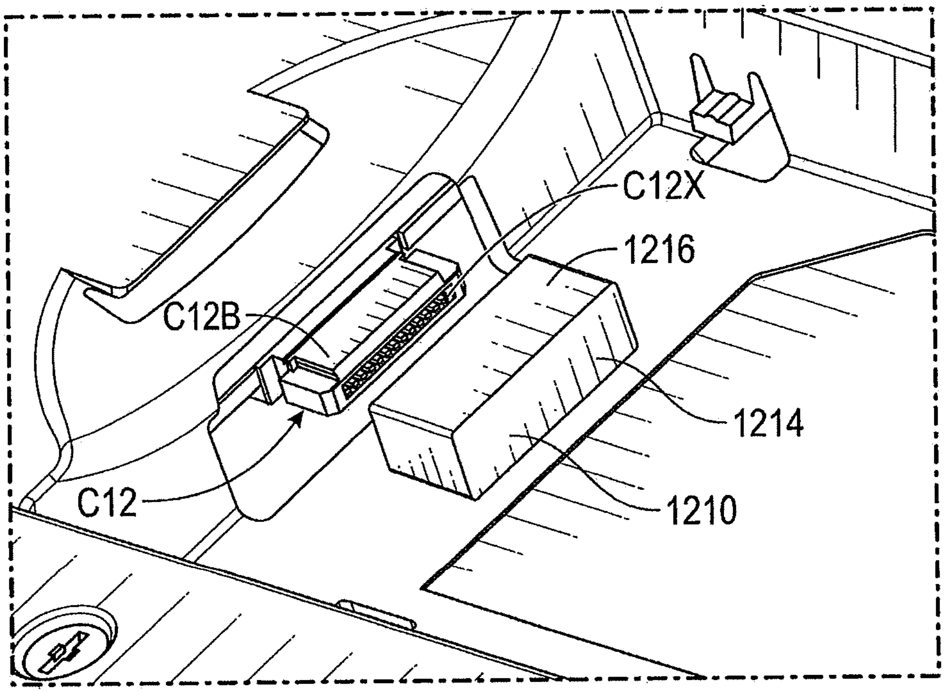
FIG. 12A is an exploded view that illustrates a printed circuit board assembly including a twelfth type of electrical connector and a protective cover device formed in accordance with a twelfth embodiment of the present development.
Figure 12B:
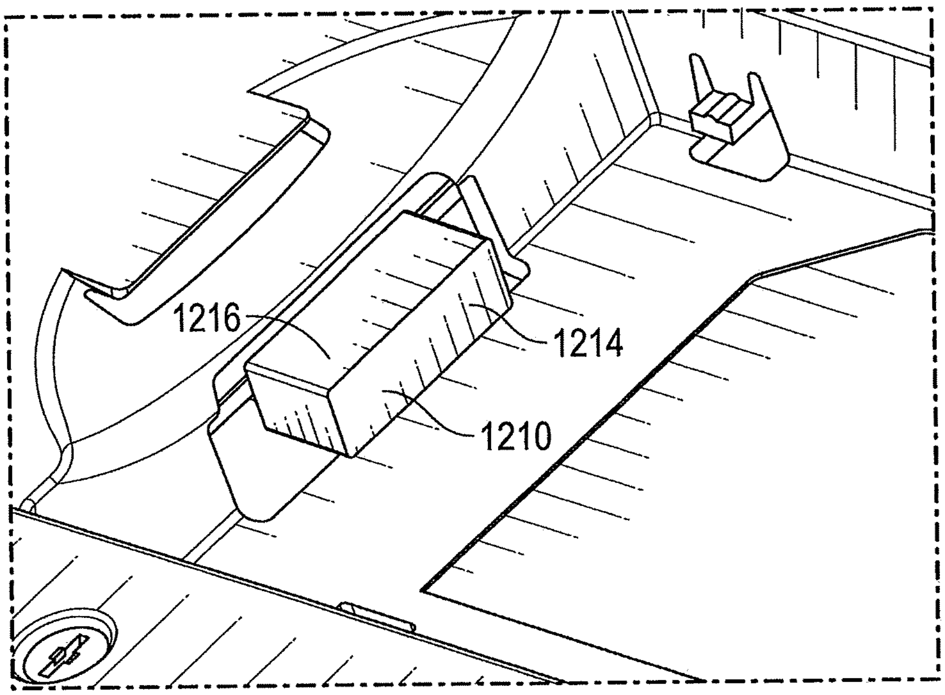
FIG. 12B is similar to FIG. 12A but shows the protective cover device operatively installed on the twelfth type of electrical connector.

As shown in FIGS. 12A-12D, a printed circuit hoard assembly P, cable, or other component can comprise a connector C12 comprising a polymeric body C12B and a plurality of metallic contacts C12X. When such a connector C12 is unused/open, it can be covered in accordance with the present development to protect the contacts C12X from corrosion and contamination. In particular, a selectively installable and removable protective cover or cover device 1210 formed in accordance with an embodiment of the present development is engaged with each unused or open connector C12 as shown in FIG. 12B to protect the contacts C12X of the connector C12 from corrosion and other contamination due to environmental contaminants. The cover device 1210 can be selectively removed from the connector C12 on which it is operatively installed for normal operative use of the edge connector C12.

Figure 12C:
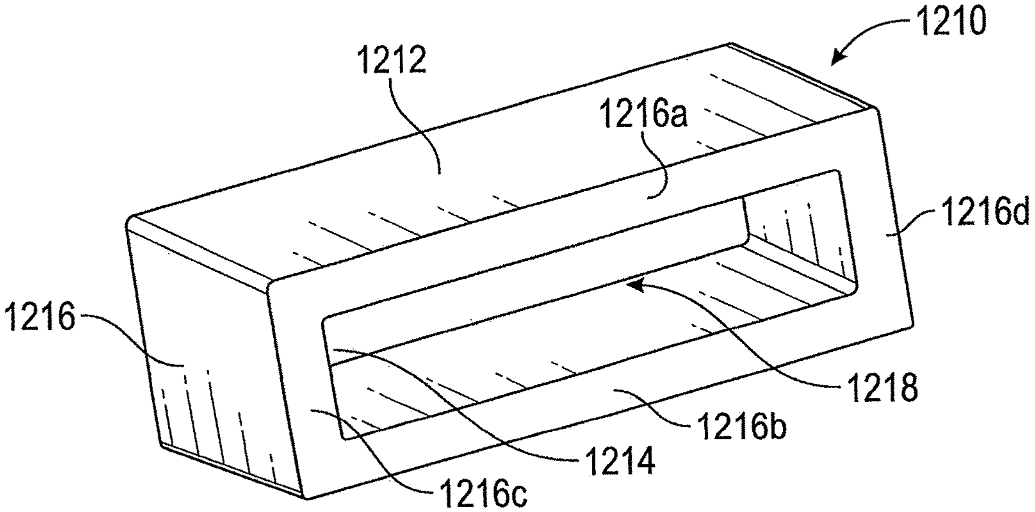
FIG. 12C is an isometric view of the protective cover device of FIGS. 12A & 12B by itself.

The cover device 1210 is shown separately in FIG. 12C and comprises a one-piece molded polymeric body 1212 that is adapted to be releasably engaged with the connector C12 as shown in FIG. 12B. The body 1212 includes a main wall 1214 and a skirt 1216 that projects outwardly from the main wall. The skirt comprises first and second spaced-apart sidewalls 1216*a*,1216*b* and first and second spaced-apart end walls 1216*c*,1216*d* that extend between and interconnect the first and second sidewalls 1216*a*,1216*b* such that a recess 1218 is defined between the sidewalls 1216*a*,1216*b* and end walls 1216*c*,1216*d*. An inner end of the recess 1218 is closed by the main wall 1214 and an outer end of the recess 1218 located at an outermost end of the skirt spaced apart from the main wall 1214 is open. The recess 1218 is sized and shaped to fit over the connector C12 with a close sliding frictional fit as shown in FIG. 12B so that the skirt 1216 and main wall 1214 cover and protect the contacts C12X and seal the contacts C12X against any contamination that can cause corrosion or other degradation.

The protective cover devices 110-1210 can be used in conjunction with selectively applied dielectric connector grease on the metal contacts C1X-C12X to provide enhanced corrosion protection for the contacts.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A printed circuit board assembly comprising:

an electrical connector comprising multiple projecting electrical pin contacts;

a protective cover device engaged with said electrical connector and covering said pin contacts to inhibit contact between a surrounding atmosphere and said pin contacts to protect said pin contacts against corrosion;

said protective cover device comprising a one-piece polymeric body including a main wall and a skirt that projects outwardly from said main wall and that comprises multiple separate recesses that respectively receive said multiple pin contacts of said electrical connector therein; and a grip that projects outwardly from the main wall in a direction opposite from the skirt.

2. A printed circuit board assembly comprising:

an electrical connector comprising at least one electrical contact;

a protective cover device engaged with said electrical connector and covering said at least one electrical contact to inhibit contact between a surrounding atmosphere and said at least one electrical contact to protect said at last one electrical contact against corrosion;

said protective cover device comprising a body including a skirt that comprises at least one recess that receives said at least one electrical contact of said electrical connector therein;

wherein said protective cover device comprises a main wall from which said skirt projects outwardly, said body further comprising a grip that projects outwardly from the main wall in a direction opposite from the skirt, wherein said skirt comprises first and second spaced-apart sidewalls and first and second spaced-apart end walls that extend between and interconnect said first and second sidewalls such that said at least one recess is defined between said first and second sidewalls and said first and second end walls;

said at least one electrical contact of said electrical connector comprising multiple projecting pin contacts and said at least one recess of said protective cover device comprising a single recess in which said multiple projecting pin contacts are located.

3. The printed circuit board assembly as set forth in claim 2, wherein said multiple projecting pin contacts are retained in said single recess with a friction fit.

4. The printed circuit board assembly as set forth in claim 3, wherein said electrical connector comprises at least one protective wall located adjacent the multiple projecting pin contacts, and wherein at least one of said sidewalls and end walls includes an outer surface that is frictionally engaged with said protective wall.

5. The printed circuit board assembly as set forth in claim 4, wherein said body of said protective cover device comprises a one-piece polymeric structure.

6. The printed circuit board assembly as set forth in claim 1, wherein said multiple separate recesses of said protective cover device correspond in size, number, and location to a size, number, and location of said multiple pin contacts of said electrical connector.

7. A printed circuit board assembly comprising:

a connector comprising at least one contact;

a protective cover device engaged with said connector and covering said at least one contact to inhibit contact between a surrounding atmosphere and said at least one contact to protect said at last one contact against corrosion;

said protective cover device comprising a body including at least one of: (i) at least one stud that is closely slidably received into a corresponding socket of said connector; (ii) a skirt that comprises at least one recess that receives said at least one contact of said connector therein;

wherein said connector comprises a fiber optic transceiver connector including a housing defining an elongated socket and a connector slot located in said socket, said connector slot including said at least one contact therein, said protective cover device comprising said at least one stud that projects axially from a main wall and includes a transverse end wall, wherein said at least one stud is closely received in said housing and includes a tab that projects outward from said transverse end wall of said at least one stud and that is received in said connector slot in contact with said at least one contact.

8. The printed circuit board assembly as set forth in claim 7, wherein said protective cover device further comprises a guide member arranged parallel to and spaced-apart from the tab.

9. The printed circuit board assembly as set forth in claim 8, wherein said guide member comprises a wall with an opening formed therein.

10. The printed circuit board as set forth in claim 9, wherein said guide member is received between the slot and the housing of the fiber optic connector.

11. The printed circuit board as set forth in claim 10, wherein said body of said protective cover device further comprises a grasping fin that projects outwardly from the main wall in a direction opposite the at least one stud.

12. The printed circuit board as set forth in claim 11, wherein said at least one stud comprises a rectangular cross-section and comprises one or more open recesses along its axial length.

13. A protective cover device for a fiber optic connector, said protective cover device comprising:

a one-piece polymeric structure including:

a main wall;

a stud that projects axially from said main wall, said stud comprising a transverse end wall located at an outer end of the stud spaced away from said main wall, said stud adapted to be closely received within an associated fiber optic connector housing;

a tab that projects outwardly from said transverse end wall, said tab adapted to be received in an associated slot located within the associated fiber optic connector housing;

a guide member projecting outwardly from the outer end of the stud, said guide member comprising a wall that that is arranged parallel to and spaced-apart from the tab, said wall of said guide member comprising an opening therein; and, a grasping fin that projects outwardly from the main wall in a direction opposite the stud.

* * * * *